United States Patent
Uno et al.

(10) Patent No.: US 7,836,696 B2
(45) Date of Patent: Nov. 23, 2010

(54) FLUID MACHINE, RANKINE CYCLE AND CONTROL METHOD

(75) Inventors: Keiichi Uno, Kariya (JP); Hironori Asa, Okazaki (JP); Kazuhide Utida, Hamamatsu (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 894 days.

(21) Appl. No.: 11/786,745

(22) Filed: Apr. 12, 2007

(65) Prior Publication Data

US 2007/0245732 A1   Oct. 25, 2007

(30) Foreign Application Priority Data

Apr. 17, 2006  (JP)  ............................. 2006-113741
Dec. 25, 2006  (JP)  ............................. 2006-348336

(51) Int. Cl.
*F01K 1/00* (2006.01)
*F01C 1/02* (2006.01)

(52) U.S. Cl. ...................... 60/670; 418/55.1; 418/55.6

(58) Field of Classification Search .................. 60/670; 418/55.1–55.6
See application file for complete search history.

(56) References Cited

U.S. PATENT DOCUMENTS 5,607,288 A * 3/1997 Wallis et al. ................ 417/310
6,227,831 B1 * 5/2001 Osima et al. ............... 418/55.4
6,322,339 B1 * 11/2001 Mitsunaga et al. ......... 418/55.2
6,398,530 B1 * 6/2002 Hasemann .................. 418/55.5
RE39,346 E * 10/2006 Lifson ........................ 418/55.5
7,263,828 B2 * 9/2007 Iwanami et al. ............... 60/414

FOREIGN PATENT DOCUMENTS

JP     58-032908    2/1983
JP     59-138707    8/1984

OTHER PUBLICATIONS

Office Action dated Apr. 6, 2010 from the Chinese patent office in the corresponding patent application No. 200710097125.0 with English translation.

* cited by examiner

*Primary Examiner*—Hoang M Nguyen
(74) *Attorney, Agent, or Firm*—Harness, Dickey & Pierce, PLC

(57) ABSTRACT

A fluid machine includes a fluidization portion for compressing or expanding a working fluid which is heated to be brought into a vapor phase state after circulating in a cycle, an oil storage portion for storing therein lubricant oil for lubricating a sliding surface of the fluidization portion, a lubricant oil feed passage for guiding the lubricant oil stored in the oil storage portion to a sliding portion of the fluidization portion by a flow of the working fluid, and a sliding surface pressure adjustment portion that is controlled to adjust a sliding surface pressure of the sliding portion. The working fluid flows inside the machine with the sliding surface pressure of the sliding portion decreased as compared with that in a normal operation of the fluidization portion by the sliding surface pressure adjustment portion, and thereafter the decreasing of the sliding surface pressure by the sliding surface pressure adjustment portion is released.

26 Claims, 10 Drawing Sheets

FLUID MACHINE, RANKINE CYCLE AND CONTROL METHOD

CROSS REFERENCE TO RELATED APPLICATION

This application is based on Japanese Patent Applications No. 2006-113741 filed on Apr. 17, 2006, and No. 2006-348336 filed on Dec. 25, 2006, the contents of which are incorporated herein by reference in its entirety.

BACKGROUND OF THE PRESENT INVENTION

1. Field of the Present Invention

The present invention relates to a fluid machine for separating lubricant oil from a working fluid and for feeding the oil to a part requiring lubrication, a Rankine cycle using the same, and a control method for the same.

2. Description of the Related Art

A conventional fluid machine include a heat exchanger for introducing a high heat source into an oil reservoir of an oil separator via piping, in a Rankine cycle including an expansion unit, a condenser, a refrigerant pump, a steam generator, and the oil separator (as disclosed in, for example, JP-A-58-32908). The oil containing liquid refrigerant in the oil reservoir is appropriately overheated by controlling an amount of feed of the heat from the high heat source introduced into the heat exchanger. The liquid refrigerant dissolved in the oil is evaporated, so that the oily, excellent lubricant oil is fed to the expansion unit via an oil pipe.

However, the above-mentioned oil separation technique requires control of the heat exchanger and of appropriate adjustment of the feed amount from the high heat source so as to separate oil from refrigerant. This results in increased number of components constructing a fluid machine device, thereby needing a large setting space and large cost for the device.

SUMMARY OF THE PRESENT INVENTION

The present invention has been accomplished in view of the foregoing problems, and it is an object of the present invention to provide a fluid machine in which a structure and method for feeding lubricant oil to a sliding portion is simplified, a Rankine cycle using the same, and a control method for the same.

According to a first example of the present invention, a fluid machine includes: fluidization means for compressing or expanding a working fluid which is heated to be brought into a vapor phase state after circulating in a cycle; oil storage means for storing therein lubricant oil for lubricating a sliding surface of the fluidization means; a lubricant oil feed passage for guiding the lubricant oil stored in the oil storage means to a sliding portion of the fluidization means by a flow of the working fluid; and sliding surface pressure adjustment means that is controlled to adjust a sliding surface pressure of the sliding portion. Furthermore, the working fluid flows inside the machine with the sliding surface pressure of the sliding portion decreased as compared with that in a normal operation of the fluidization means by the sliding surface pressure adjustment means, and thereafter the decreasing of the sliding surface pressure by the sliding surface pressure adjustment means is released.

With this arrangement, the lubricant oil can be fed to the sliding portion by control of the sliding surface pressure by the sliding surface pressure adjustment means, which can provide a fluid machine for feeding the lubricant oil to the sliding portion with a simple structure without needing a complicated control process.

For example, the sliding surface pressure adjustment means includes opening and closing means for opening and closing a communication passage for communicating a high-pressure portion of fluidization means with a low-pressure portion thereof. In this case, the working fluid flows with the high-pressure portion of the fluidization means communicated with the low-pressure portion thereof via the communication passage for connecting both portions by the opening and closing means. This can decrease the sliding surface pressure with a simple structure without needing complicated control.

Alternatively, the fluid machine may include a communication passage for communicating the high-pressure portion of the fluidization means with the low-pressure portion thereof, and opening and closing means for opening and closing the communication passage. The working fluid flows inside the machine with the communication passage opened by the opening and closing means, and thereafter the communication passage is closed by the opening and closing means. Thus, the working fluid flows with the high-pressure portion of the fluidization means communicated with the low-pressure portion thereof via the communication passage for connecting both portions by the opening and closing means. This can feed the lubricant oil to the sliding portion with a simple structure without needing complicated control.

The fluid machine may further include separation means for separating the lubricant oil to be supplied to the oil storage means, from the working fluid, and the separation means may be disposed in the downstream area from the communication passage. According to the present invention, the oil is separated in the low-pressure area, thereby providing a fluid machine that facilitates control of the flow rate of a working fluid, making it easy to separate the oil. Alternatively, the fluid machine may further include separation means for separating the lubricant oil to be supplied to the oil storage means, from the working fluid, and the separation means may be provided in the upstream area from the communication passage. Because the lubricant oil is separated in the high-pressure area, the volume flow rate of the working fluid is small, so that a pressure loss can be reduced. In the design under the same pressure loss condition, the fluid machine can be reduced in size.

The fluid machine may further include separation means for separating the lubricant oil to be fed to the oil storage means, from the working fluid, and the separation means may be a centrifugal separator for separating the lubricant oil from the working fluid using a centrifugal force. In this case, the lubricant oil is separated by the centrifugal separator, thus allowing gas having a small density to flow toward the downstream side using the centrifugal force, and allowing the oil having a larger density than that of the gas to fly outward and drop. This can enhance the accuracy of oil separation with a simple structure using a rotation mechanism.

Furthermore, the above-mentioned fluid machine may include control means for controlling an operation of sliding surface pressure decreasing means to perform a sliding surface pressure decreasing mode which involves decreasing a sliding surface pressure of a sliding portion. The control means may start the sliding surface pressure decreasing mode when a temperature of a coolant for an engine exceeds a predetermined temperature in actuation of the fluidization means. In this case, when the engine coolant temperature exceeds the predetermined temperature, the lubricant oil having a high viscosity appropriate for lubrication can be separated thereby improving a wear prevention effect of the sliding portion, and effectively carrying out the sliding surface pressure decreasing control while minimizing waste.

The fluid machine may further include control means for controlling an operation of the sliding surface pressure decreasing means to perform a sliding surface pressure decreasing mode which involves decreasing the sliding surface pressure of the sliding portion, and the control means may terminate the sliding surface pressure decreasing mode when a circulation amount of the working fluid flowing inside the machine in operation of the fluidization means exceeds a predetermined amount. Alternatively, the control means may control not to perform the sliding surface pressure decreasing mode when the number of times of actuation of the fluidization means after stopping of the engine and turning on of an ignition switch reaches a predetermined number or more. Alternatively, the control means may control not to perform the sliding surface decreasing mode in actuation of the fluidization means when an elapsed time from a previous stopping time does not exceed the predetermined time.

Alternatively, the fluid machine may further include control means for controlling the operation of the sliding surface pressure decreasing means to perform a first sliding surface pressure decreasing mode and a second sliding surface pressure decreasing mode which involve decreasing the sliding surface pressure of the sliding portion. In this case, the control means may perform the first sliding surface pressure decreasing mode when the number of times of actuation of the fluidization means after stopping of the engine and turning on of the ignition switch is less than a predetermined number. The control means may perform the second sliding surface pressure decreasing mode when the number of times of actuation of the fluidization means reaches the predetermined number or more. Specifically, the second sliding surface pressure decreasing mode involves decreasing a circulation amount of the working fluid flowing inside the machine as compared with that in the first sliding surface pressure decreasing mode. This can effectively carry out the sliding surface pressure decreasing control while minimizing waste.

The control means may perform the first sliding surface pressure decreasing mode in actuation of the fluidization means when an elapsed time from the previous stopping time exceeds the predetermined time. Further, the control means may perform the second sliding surface pressure decreasing mode in actuation of the fluidization means when the elapsed time does not exceed the predetermined time. The second sliding surface pressure decreasing mode involves decreasing the circulation amount of the working fluid flowing inside the machine as compared with that in the first sliding surface pressure decreasing mode.

According to a second example of the present invention, a Rankine cycle includes: a pump for pressurizing and feeding a working fluid; a heater for heating the working fluid pressurized and fed by the pump into a vapor-phase state; an expansion unit for generating a driving force by expanding the working fluid flowing from the heater; a condenser for condensing the working fluid flowing from the expansion unit; oil storage means for storing therein lubricant oil for lubricating a sliding surface of the expansion unit; a lubricant oil feed passage for guiding the lubricant oil stored in the oil storage means to a sliding portion of the expansion unit by a flow of the working fluid; sliding surface pressure adjustment means for adjusting a sliding surface pressure of the sliding portion; and control means for controlling operations of the pump and the sliding surface pressure adjustment means. Furthermore, the control means operates the pump with the sliding surface pressure of the sliding portion decreased as compared with that in a normal operation of the expansion unit by the sliding surface pressure adjustment means, and then stops the decreasing of the sliding surface pressure by the sliding surface pressure adjustment means. In this case, the lubricant oil is fed to the sliding portion of the expansion unit by the control of the sliding surface pressure by the sliding surface pressure adjustment means, which does not need complicated control, so as to feed the lubricant oil to the sliding portion.

Alternatively or additionally, the sliding surface pressure adjustment means may include opening and closing means for opening and closing the communication passage for communicating the high-pressure portion of the expansion unit with the low-pressure portion thereof. In this case, a pump is operated to allow the working fluid to flow with the high-pressure portion of the expansion unit communicated with the low-pressure portion thereof via the communication passage connecting both portions by the opening and closing means. This can decrease the sliding surface pressure with a simple structure without needing complicated control.

According to a third example of the present invention, a Rankine cycle includes: oil storage means for storing therein lubricant oil for lubricating a sliding surface of an expansion unit; a lubricant oil feed passage for guiding the lubricant oil stored in the oil storage means to a sliding portion of the expansion unit by a flow of the working fluid; a communication passage through which a high-pressure portion of the expansion unit communicates with a low-pressure portion of the expansion unit; opening and closing means for opening and closing the communication passage; and control means for controlling operations of a pump and the opening and closing means. Furthermore, the control means operates the pump with the communication passage opened by the opening and closing means, and then closes the communication passage by the opening and closing means. In this case, the pump is operated to allow the working fluid to flow with the high-pressure portion of the expansion unit communicated with the low-pressure portion thereof via the communication passage connecting both portions by the opening and closing means. This can feed the lubricant oil to the sliding portion with a simple structure without needing complicated control.

According to a fourth example of the present invention, a control method of a fluid machine includes a first step of guiding lubricant oil to a sliding surface of fluidization means by allowing the working fluid to flow with a sliding surface pressure of a sliding portion decreased, and a second step of stopping the decreasing of the sliding surface pressure. Thus, the control method of a fluid machine can be provided which prevents the wear and seizing of the sliding portion without needing complicated control. Also, this control method can prevent the wear and seizing of the sliding portion of the fluid machine thereby to ensure a product life.

For example, the first step may be a step of allowing the working fluid to flow by communicating a high-pressure portion of the fluidization means with a low-pressure portion thereof, and the second step may be a step of interrupting the communication between the high-pressure portion of the fluidization means and the low-pressure portion thereof.

According to a fifth example of the present invention, a control method of a fluid machine includes a first step of guiding lubricant oil to a sliding surface of a sliding portion by allowing the working fluid to flow with a high-pressure portion of fluidization means communicated with a low-pressure portion thereof by a communication passage, and a second step of closing the communication passage. This can provide a control method together with feed of the lubricant oil to the sliding portion and a normal electric generation operation without needing complicated control.

For example, the second step may involve stopping the decreasing of the sliding surface pressure, or closing the communication passage when a lubricant oil detection condition for detecting feed of the lubricant oil to the sliding surface of the sliding portion is satisfied. In this case, the adoption of the appropriate lubricant oil detection condition can perform the control of decreasing of the sliding surface pressure and the control of communication of the communication passage more appropriately, and can also reduce the execution of useless control for oil separation.

According to a sixth example of the present invention, a control method of a Rankine cycle includes a first step of guiding lubricant oil to a sliding surface of an expansion unit by allowing the working fluid to flow by an operation of a pump with a sliding surface pressure of a sliding portion of the expansion unit decreased, and a second step of stopping the decreasing of the sliding surface pressure. This can prevent the wear and seizing of the sliding portion of the expansion unit in actuation of the Rankine cycle to ensure a product life. For example, the first step is a step of operating the pump with the high-pressure portion of the expansion unit communicated with the low-pressure portion thereof, and the second step is a step of interrupting the communication between the high-pressure portion of the expansion unit and the low-pressure portion thereof.

According to a seventh example of the present invention, a control method of a Rankine cycle includes a first step of guiding lubricant oil to a sliding surface of an expansion unit by allowing the working fluid to flow by an operation of a pump with a high-pressure portion of the expansion unit communicated with a low-pressure portion thereof by a communication passage, and a second step of closing the communication passage. This can provide a control method of a Rankine cycle together with the feed of the lubricant oil to the sliding portion and the transfer to a normal operation without needing complicated control.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

Figure 1:
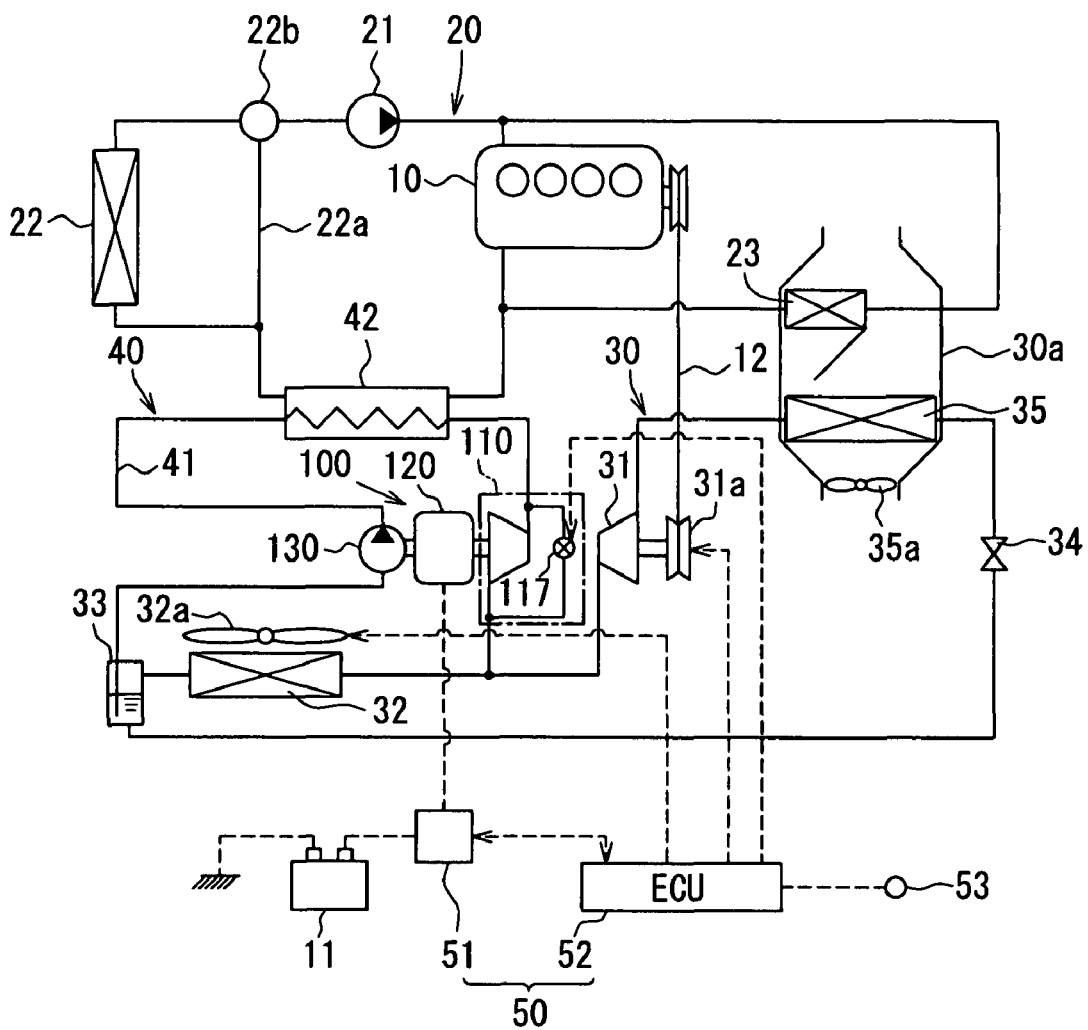
FIG. 1 is a schematic diagram showing an entire system according to a first embodiment of the present invention.

In this embodiment, a refrigerant-pump integrated type expansion generator (hereinafter referred to as a pump expansion generator) 100 employed as one example of a fluid machine of the present invention will be described below. The pump expansion generator 100 is used in a Rankine cycle 40 which uses a condenser 32 and a vapor-liquid separator 33 in common with a refrigeration cycle 30 for a vehicle. The pump expansion generator 100 has an expansion unit 110 serving as fluidization means, a motor generator 120 which is a portion driven by the expansion unit 110 and serving an electric motor and a generator, and a refrigerant pump 130, all of which are formed integrally.

This embodiment will be described below with reference to FIGS. 1, 2, 4, and 5. FIG. 1 shows an entire system structure. The refrigeration cycle 30 is to use cold heat and hot heat for air conditioning by allowing heat on the low-temperature side to be transferred to the high-temperature side. The refrigeration cycle is formed by annularly connecting a compressor 31, the condenser 32, the vapor-liquid separator 33, a decompressor 34, and an evaporator 35 in sequence.

The compressor 31 is operated by being supplied with a driving force of a vehicle engine 10 transferred via a driving belt 12, a pulley 31a, and an electromagnetic clutch 31b to compress refrigerant of the refrigeration cycle 30 into high-temperature and high-pressure one. The condenser 32 is a heat exchanger that cools the high-temperature and high-pressure refrigerant compressed by the compressor 31 to condense and liquefy it. The vapor-liquid separator 33 is a receiver that separates the refrigerant condensed by the condenser 32 into vapor-phase and liquid-phase refrigerants to flow out the liquid-phase refrigerant. A fan 32a sends air outside a compartment of the vehicle to the condenser 32 as cooling air.

The decompressor 34 is an expansion valve for decompressing and expanding the liquid-phase refrigerant separated by the vapor-liquid separator 33. The evaporator 35 is a heat exchanger for evaporating the refrigerant decompressed by the decompressor 34 to exhibit a heat absorption action, and is disposed in an air conditioning case 30a. The outside or inside air taken into the air conditioning case 30a by a blower 35a is cooled by the evaporator 35, to be blown into the vehicle compartment as conditioned air.

The Rankine cycle 40 collects the energy as the driving force created by the expansion unit 110 from waste heat generated at the energy 10. The Rankine cycle 40 uses the condenser 32 and the vapor-liquid separator 33 in common with the refrigeration cycle 30. The Rankine cycle 40 includes a bypass flow path 41 for bypassing the condenser 32 and the vapor-liquid separator 33. The Rankine cycle 40 further includes the refrigerant pump 130, a heater 42, and the expansion unit 110 in this order from the near side of the vapor-liquid separator 33 of the bypass flow path 41, and the condenser 32 is linked to the expansion unit 110.

The refrigerant pump 130 is to pressurize, feed, and circulate the refrigerant serving as the working fluid in the Rankine cycle 40 to the heater 42 side. The refrigerant inside the Rankine cycle 40 is the same as that in the refrigeration cycle 30. The heater 42 is a heat exchanger to heat the refrigerant so as to create overheated steam refrigerant by exchanging heat between the refrigerant pressurized and fed by and from the refrigerant pump 130 and an engine coolant (hot water) circulating in a hot water circuit 20 disposed in the engine 10.

The hot water circuit 20 is provided with an electric water pump 21 for circulating the engine coolant, a radiator 22 for exchanging heat between the engine coolant and the outside air and for cooling the engine coolant, and a heater core 23 for heating the conditioned air using the engine coolant as a heating source. The radiator 22 is provided with a radiator bypass flow path 22a. The flow rate of the engine coolant passing through the radiator 22 is adjusted by a thermostat 22b which is adapted to open and close a valve portion according to the temperature of the engine coolant. The heater core 23 is disposed in the air conditioning case 30a together with the evaporator 35, so that the conditioned air is adjusted to a passenger's set temperature by the evaporator 35 and the heater core 23.

The expansion unit 110 generates the driving force by expansion of the overheated steam refrigerant flowing from the heater 42. An energization control circuit 50 controls the operations of various kinds of devices in the refrigeration cycle 30 and the Rankine cycle 40, and has an inverter 51 and a control device 52 serving as control means. A control signal can be received and sent between both the inverter 51 and the control device 52.

The inverter 51 is adapted to control the operation of a motor generator 120, and specifically, to control power supplied from a battery 11 for a vehicle to the motor generator 120 when the motor generator 120 is operated as the electric motor. The inverter 51 charges the battery 11 by feeding the power generated when the motor generator 120 is operated as an electric generator by the driving force of the expansion unit 110, while grasping a charged state of the battery 11.

The control device 52 controls the operation of the inverter 51, and also controls the operations of the electromagnetic clutch, the fan 32a, an equalizing valve 117 of the expansion unit 110 or the like when the refrigeration cycle 30 and the Rankine cycle 40 are operated. The control device 52 is connected to a power supply switch, for example, an ignition switch 53. When the ignition switch 53 is turned off, the supply of power from the battery 11 is stopped which terminates the operations of the control device 52 and also of the inverter 51, the refrigeration cycle 30, and the Rankine cycle 40.

Now, the structure of the pump expansion generator 100 will be explained with reference to FIG. 2. The pump expansion generator 100 includes the expansion unit 110, the motor generator 120, and the refrigerant pump 130 which are coaxially connected to each other and integrally formed.

The expansion unit 110 is a scroll type compression mechanism, and specifically includes a high-pressure chamber 114 serving as a high-pressure portion, an inflow port 115, a fixing scroll 112, a rotation scroll 113 serving as a sliding portion, a low-pressure chamber 113e serving as a low-pressure portion, and the equalizing valve 117 serving as opening and closing means, and the like, which are formed inside an expansion unit housing 111. The expansion unit housing 111 is formed such that a front housing 111a, an outer peripheral portion of the fixing scroll 112, and a shaft housing 111b are connected to be arranged in this order.

The high-pressure chamber 114 is a space corresponding to the high-pressure portion, and is formed between the front housing 111a and a substrate portion 112a of the fixing scroll 112. The high-pressure chamber 114 is configured to absorb pulsation of the high-temperature and high-pressure refrigerant flowing from the heater 42 into this chamber, that is, the overheated steam refrigerant. The high-pressure chamber 114 is provided with a high-pressure port 111c connected to the heater 42.

The inflow port 115 is a port provided by forming a hole at the center of the substrate portion 112a of the fixing scroll 112. The inflow port 115 is to communicate the high-pressure chamber 114 with an operation chamber V having the minimum volume in the operation chamber V formed by the fixing scroll 112 and the rotation scroll 113. The overheated stream refrigerant introduced into the high-pressure chamber 114 is guided to the operation chamber V via the inflow port 115.

The fixing scroll 112 includes spiral tooth portions 112b protruding from the plate-like substrate portion 112a toward the rotation scroll 113 side. The rotation scroll 113 corresponds to the sliding portion, and includes spiral tooth portions 113b meshing in contact with the tooth portions 112b, and a substrate portion 113a with the tooth portions 113b formed thereon. Rotating the rotation scroll 113 with both tooth portions 112b, 113b being in contact with each other enlarges or shrinks the volume of the operation chamber V formed by both scrolls 112 and 113.

The high-pressure chamber 114 and the rotation scroll 113 are partitioned by the substrate portion 112a of the fixing scroll 112. A sliding plate 113c serving as a sliding portion for assisting in a smooth rotating movement of the rotation scroll 113 intervenes in between the rotation scroll 113 and the shaft housing 111b.

A shaft 118 is coupled to the rotation scroll 113. That is, the shaft 118 is rotatably supported by a bearing 118b fixed to the shaft housing 111b, and formed on one end of one side in the longitudinal direction as a crankshaft having a crank portion 118a that is eccentric with respect to a rotation central axis of the shaft. The crank portion 118a is coupled with the rotation scroll 113 via a bearing 113d.

A rotation prevention mechanism 119 is provided between the rotation scroll 113 and the shaft housing 111b. The rotation prevention mechanism 119 allows the rotation scroll 113 to turn one time around the crank portion 118a while the shaft 118 rotates on its axis one time. Thus, when the shaft 118 rotates, the rotation scroll 113 revolves around the rotation central axis of the shaft 118 without rotating on its axis. The operation chamber V has its volume changed to be increased as it is displaced toward the outer diameter side from the center of the rotation scroll 113, by the driving force from the motor generator 120, that is, together with the rotation of the shaft 118, and further by expansion of the overheated steam refrigerant from the heater 42.

A space between the outer peripheral side of the tooth portions 113b of the rotation scroll 113 and the outer peripheral side of the fixing scroll 112 is formed as the low-pressure chamber 113e into which the low-pressure refrigerant expanded flows.

A low-pressure port 121a connected from the expansion unit 110 to the condenser 32 is provided near the refrigerant pump 130 at the upper part of a motor housing 121. On the opposite side of the motor housing 121 to the low-pressure port 121a is provided a discharge gas passage 111d serving as a fluid passage which extends upward from the low pressure side of both scrolls 112, 113 of the expansion unit 110, that is, from the outer peripheral side of the scroll to lead to the upper part of the motor housing 121. Thus, the low-pressure port 121a and the low pressure side of the expansion unit 110 (the outer peripheral side of the scroll) communicate with each other through the discharge gas passage 111d and the space inside the motor housing 121.

The equalizing valve 117 is opening and closing means for opening and closing a communication passage 116 which communicates the high-pressure chamber 114 with the low-pressure chamber 113e. The communication passage 116 penetrates the outer peripheral side part of the substrate portion 112a of the fixing scroll 112 to bypass the operation chamber V, while serving as a through hole for directly causing the high-pressure chamber 114 to communicate with the low-pressure chamber 113e. Sliding surface-pressure adjustment means is controlled to adjust the pressure of a sliding surface of the sliding portion, such as the sliding plate 113c. The sliding surface pressure adjustment means consists of at least the equalizing valve 117.

The equalizing valve 117 includes a valve body 117a having a spring 117c intervening in a back-pressure chamber 117b, a throttle 117d having a predetermined passage resistance and serving as resistance means for causing the back-pressure chamber 117b to communicate with the high-pressure chamber 114, and an electromagnetic valve 117e for adjusting the pressure of the back-pressure chamber 117b by communicating with the back-pressure chamber 117b and by opening or closing the low-pressure chamber 113e side.

The opening and closing of the electromagnetic valve 117e is controlled by an electric signal from the control device 52, for example, by energization and disenergization. In this embodiment, when the energization from the control device 52 to the electromagnetic valve 117e is interrupted, the electromagnetic valve 117e is brought into an opened state. Then, the back-pressure chamber 117b and the low-pressure chamber 113e communicate with each other, and the pressure of the back-pressure chamber 117b is released toward the low-pressure chamber 113e. Thus, the pressure of the back-pressure chamber 117b is decreased to a lower level than that of the high-pressure chamber 114, so that the valve body 117a is displaced to compress the spring 117c by the pressure on the high-pressure chamber 114 side. This causes a space between the valve body 117a and the substrate portion 112a of the fixing scroll 112, thereby opening the communication passage 116. In this way, the equalizing valve 117 acts as a bypass valve for allowing the refrigerant to bypass the operation chamber V and to flow through between the high-pressure chamber 114 and the low-pressure chamber 113e.

When the refrigerant circulates in actuation of the Rankine cycle 40 or the like with the communication passage 116 opened, the liquid refrigerant remaining in a pipe returns to between the refrigerant heater and an inlet of the expansion unit 110. At this time, since the communication passage 116 is opened, most of the refrigerant passes through the communication passage 116. Part of the refrigerant flows into the operation chamber V. As a difference in pressure hardly occurs, a load is small, thereby preventing the damage to the sliding portion. When the operation of the generator further continues, the refrigerant completely evaporates and returns to the original position.

In contrast, upon energization of the electromagnetic valve 117e from the control device 52, the electromagnetic valve 117e is brought into a closed state. The communication between the back-pressure chamber 117b and the low-pressure chamber 113e is interrupted, so that the pressure of the high-pressure chamber 114 is applied to the back-pressure chamber 117b via the throttle 117d. The valve body 117a is displaced toward the substrate portion 112a by a spring force of the spring 117c, thus eliminating a space between the valve body 117a and the substrate portion 112a to close the communication passage 116.

The motor generator 120, which is a driven portion or electric rotation means of the present invention, is constructed of a stator 122 and a rotor 123 or the like rotating in the stator 122. The motor generator 120 is accommodated in the motor housing 121 fixed to the shaft housing 111b. The stator 122 is a stator coil consisting of a winding wire, and fixed to an inner peripheral surface of the motor housing 121. The rotor 123 is a magnet rotor in which a permanent magnet is embedded, and fixed to a motor shaft 124. The motor shaft 124 has one end connected to the shaft 118 of the expansion unit 110, and the other end connected to a pump shaft 132 of the refrigerant pump 130 which is formed to make its diameter smaller.

The motor generator 120 acts as an electric motor for driving the expansion unit 110 and the refrigerant pump 130 by rotating the rotor 123 when the power is supplied from the battery 11 to the stator 122 via the inverter 51 in actuation of the Rankine cycle 40. Also, the motor generator 120 drives the refrigerant pump 130 when a torque for rotating the rotor 123 is input by the driving force generated in the expansion of the expansion unit 110, while acting as a generator (electric generator) for generating the electric power when the generated driving force at the expansion unit 110 exceeds the driving force for the refrigerant pump 130. The power obtained is fed to the battery 11 via the inverter 51, which charges the battery 11.

The refrigerant pump 130 is a rolling piston type pump which is disposed on the side opposite to the expansion unit of the motor generator 120, and accommodated in a pump housing 131 fixed to the motor housing 121. The refrigerant pump 130 also includes a cylinder 133a, a rotor 134, and the like formed inside the pump housing 131. The cylinder 133a is provided to form a hole having a circular section at the center of a cylinder block 133.

The pump shaft 132 is connected to the motor shaft 124, and rotatably supported by bearings 132b, 132c fixed to end plates 137 sandwiching therein the cylinder block 133. The pump shaft 132 has a circular cam portion 132a that is eccentric with respect to the pump shaft 132. A flat cylindrical rotor 134 is mounted on the outer peripheral side of the cam portion 132a. The outer diameter of the rotor 134 is set to be smaller than the inner diameter of the cylinder 133a. The rotor 134 is inserted into the cylinder 133a. The rotor 134 revolves inside the cylinder 133a by the cam portion 132a.

A vane 135 is provided on the outer peripheral portion of the rotor 134 to be slidable in the radial direction of the rotor 134. The vane 135 is pressed toward the center and abutted against the rotor 134. A space enclosed by the rotor 134 and the vane 135 is formed as a pump operation chamber P inside the cylinder 133a.

The cylinder block 133 is provided with a refrigerant inlet 133b which is disposed near the vane 135 in communication with the inside of the cylinder 133a so as to hold the vane 135, and a refrigerant outlet (not shown). The refrigerant inlet 133b is connected to a suction port 131a penetrating the pump housing 131. The refrigerant outlet is in communication with the high-pressure chamber 136 formed between the pump housing 131 and the cylinder block 133 or the end plate 137 via the discharge valve 133c. The high-pressure chamber 136 leads to a discharge port 131b formed on a side wall on the motor generator 120 side of the pump housing 131.

In the refrigerant pump 130, the refrigerant flows from the suction port 131a and the refrigerant inlet 133b into the pump operation chamber P by the revolution operation of the rotor 134, and is discharged from the discharge port 131*b* through the refrigerant outlet, the discharge valve 133*c*, and the high-pressure chamber 136.

The pump expansion generator 100 further includes separation means for storing the lubricant oil circulating therein together with the refrigerant, which is the working fluid, and for feeding the oil to the sliding portion by enhancing viscosity of the lubricant oil.

The separation means consists of various components for separating the lubricant oil from the working fluid as follows. That is, the overheated steam refrigerant is circulated as the working fluid in the cycle while the communication passage 116 communicates the high-pressure chamber 114 with the low-pressure chamber 113*e* via the equalizing valve 117. In this case, most of the working fluid passes through the discharge gas passage 111*d*, while decreasing the flow rate to come into collision with the inner wall surface of the motor housing 121, so that the lubricant oil is separated from the refrigerant. The separated lubricant oil falls due to its own weight, and passes through the stator 122 of the motor generator 120 and the winding wire of the rotor 123. Then, the lubricant oil is stored in an oil reservoir 101 serving as oil storage means.

The oil reservoir 101 is provided at the lower part of the motor generator 120 and at the upper part of the expansion unit 110 to store therein the lubricant oil separated from the refrigerant. The oil reservoir 101 is formed on the lower side from the lower end of the stator 122 of the motor generator 120 in the shaft housing 111*b*, that is, as a groove dug to be located in the vicinity of the sliding plate 113*c* serving as the sliding portion of the expansion unit 110.

A partition portion 101*a* is formed between the oil reservoir 101 and the sliding plate 113*c*, and the thickness of the partition portion 101*a* is thinner than that of the entire shaft housing 111*b*. An oil passage 102 is formed in the partition portion 101*a* as a passage for communicating the bottom part of the oil reservoir 101 with the upper side of the sliding plate 113*c*. The oil passage 102 is a lubricant oil feed passage for widely spreading the lubricant oil stored in the oil reservoir 101 to parts requiring circulation, such as the sliding plate 113*c* or the like serving as the sliding portion.

A shaft passage 103 serving as a passage for communicating one end in the longitudinal direction of the crank portion 118*a* with the outer peripheral portion of the cam portion 132*a* is formed inside the shaft 118, the motor shaft 124, and the pump shaft 132, which are integrally formed. An orifice 104 is provided for serving as resistance means having a predetermined passage resistance, in a position near the outer peripheral portion of the cam portion 132*a* in the shaft passage 103.

Now, the procedure of operation control of the pump expansion generator 100 in this embodiment will be described using a flowchart shown in FIG. 4.

First, the control device 52 determines presence of a requirement for electric generation, that is, whether the operation of the Rankine cycle is allowable or not, in step S100. The requirement for electric generation is determined from a charged state of the battery 11 which is identified by the inverter 51. When the present charged amount is equal to or less than a predetermined charged amount, it is determined that the requirement for electric generation is present. The control device 52 opens an electromagnetic valve 117*e* serving as a bypass valve when the requirement for electric generation is determined to be present in step S100. Specifically, the energization of the electromagnetic valve 117*e* is interrupted to cause the electromagnetic valve 117*e* to be opened, and thus the valve body 117*a* slides toward the back-pressure chamber 117*b* side, thereby opening the communication passage 116 (which is performed in step S110).

The control device 52 operates the motor generator 120 as the electric motor. The refrigerant pump 130 and the expansion unit 110 are operated by the motor generator 120, so that the Rankine cycle 40 is actuated to be brought into a refrigerant circulation mode (step S120). The refrigerant is sucked by the refrigerant pump 130 from the vapor-liquid separator 33 to be pressurized and fed to the heater 42, and then flows into the expansion unit 110. At this time, with the communication passage 116 opened, the refrigerant bypasses the operation chamber V, flows from the high-pressure chamber 114 directly into the low-pressure chamber 113*e*, and passes through the discharge gas passage 111*d* in the motor housing 121. The refrigerant flows from the low-pressure port 121*a*, and then leads to the vapor-liquid separator 33 via the condenser 32. When the operation further continues, the refrigerant completely evaporates and returns to the original position.

The control device 52 closes the equalizing valve 117 when it is determined that the predetermined time has passed since the actuation of the refrigerant pump 130 in step S130. Specifically, the electromagnetic valve 117*e* is energized to be closed, and thus the valve body 117*a* slides toward the substrate portion 112*a* side, thereby closing the communication passage 116 (which is performed in step S140).

The time when it is detected that the predetermined time has passed is the time when a lubricant oil detection condition is satisfied. The lubricant oil detection condition is for detecting the separation of lubricant oil from the refrigerant and the feed of the lubricant oil separated to the sliding portion, including the sliding plate 113*c*. The predetermined time is a time needed for the lubricant oil to return to the sliding portion requiring the lubrication, and determined by a real machine verification test, a simulation, and the like to be stored previously in the control device 52.

In this way, a difference in pressure between the high-pressure chamber 114 and the low-pressure chamber 113*e* occurs by closing the communication passage 116, so that the refrigerant flowing into the expansion unit 110 flows through the original high-pressure chamber 114, the inflow port 115, the operation chamber V, and the low-pressure chamber 113 in this order. After the normal electric generation operation together with the control of an amount of electric generation in step S150, the control device 52 terminates a series of control processes as mentioned above.

In other words, the high-temperature and high-pressure overheated steam refrigerant heated by the heater 42 is introduced into the operation chamber V of the expansion unit 110 to expand itself. When the rotation scroll 113 is rotated by the expansion of the overheated steam refrigerant, the motor generator 120 and the refrigerant pump 130 connected to the rotation scroll 113 are operated.

When the driving force of the expansion unit 110 exceeds a driving force for driving the refrigerant pump 130, the motor generator 120 is operated as the electric generator, and the control device 52 charges the battery 11 by feeding power generated by the motor generator 120 via the inverter 51. The refrigerant whose expansion by the expansion unit 110 is terminated and whose pressure is decreased is circulated through the condenser 32, the vapor-liquid separator 33, the bypass flow path 41, the refrigerant pump 130, the heater 42, and the expansion unit 110 in this order. In this way, the refrigerant is circulated in the Rankine cycle 40.

In this series of control processes, the lubricant oil contained in the refrigerant continues to be separated from the refrigerant by the separation means. In particular, the lubricant oil is separated from the refrigerant (working fluid) with the communication passage 16 opened by the equalizing valve 117, that is, with a difference in pressure between the high-pressure chamber 114 and the low-pressure chamber 113e being small or little. Thus, the lubricant oil needed for the sliding portion is supplied without causing damage to the sliding portion, such as the sliding plate 113c.

Specifically, when the overheated steam refrigerant flows from the discharge gas passage 111d into the motor housing 121, a flow path is enlarged to decrease the flow rate of the refrigerant, so that the lubricant oil is separated from the refrigerant. The separated oil passes through a space(s) formed in the winding wire of the stator 122 of the motor generator 120, in the winding wire of the rotor 123, and/or between components, falls due to its weight, and then is stored in the oil reservoir 101 located at the bottom. The lubricant oil stored in the oil reservoir 101 is heated by a heat effect from the operation chamber V of the expansion unit 110 and the high-pressure chamber 114 which become high temperature portions (high-pressure side areas).

The lubricant oil is thus heated, and the refrigerant contained in the lubricant oil evaporates, resulting in increased viscosity of the lubricant oil. For example, the refrigerant expanded by and discharged from the expansion unit 110 operating at about 80 degrees is brought into a state of 1.0 MPa in pressure and of about 45 degrees in temperature, at the outside air temperature of 25 degrees. In this state, the refrigerant is dissolved in concentration of about 40% (mass fraction) in the lubricant oil, so that the viscosity of the lubricant oil is decreased up to about 2 cst. However, when the lubricant oil is heated to about 60 degrees, one-half or more of the refrigerant evaporates, and thus the viscosity of the oil is increased up to about 7 cst, which is a viscosity appropriate for lubrication of the expansion unit 110.

The lubricant oil whose viscosity is increased by being heated in the oil reservoir 101 falls through the oil passage 102 due to its weight, and is sucked by the difference in pressure between the expansion unit 110 and the refrigerant pump 130 to lead to the sliding plate 113c and the bearing 113d, which are sliding portions of the expansion unit 110. The oil then leads to the bearings 132b, 132c from the rotor 134 of the refrigerant pump 130 via the shaft passage 103. The lubricant oil reaching the bearing 132b and 132c is dissolved again into the liquid refrigerant in the refrigerant pump 130 from the pump operation chamber P, thus circulating in the Rankine cycle 40.

The amount of the lubricant oil passing through the shaft passage 103 is adjusted by the orifice 104. That is, the circulation of the lubricant oil is allowed even through the resistance of the orifice 104, but a great amount of refrigerant does not lead directly to the refrigerant pump 130 from the motor housing 121 through the shaft passage 103.

Reference will now be made to another operation control method of the fluid machine which includes step S131 shown in FIG. 5, instead of step S130 in the control method shown in FIG. 4. In this case, after performing the process in step S120 described above, the control device 52 closes the equalizing valve 117 when it is determined that circulation of a predetermined flow rate of refrigerant has been counted in step S131, after the actuation of the refrigerant pump 130. Specifically, the electromagnetic valve 117e is energized to be closed, and thus the valve body 117a slides toward the substrate portion 112a, thereby closing the communication passage 116 (which is performed in step S140).

The time when it is detected that the circulation of the predetermined flow rate of the refrigerant has been measured is the time when a lubricant oil detection condition is satisfied. The lubricant oil detection condition is for detecting the separation of lubricant oil from the refrigerant and the feed of the lubricant oil separated to the sliding portion, including the sliding plate 113c. The predetermined refrigerant flow rate is a flow rate of circulation needed for the lubricant oil to return to the sliding portion requiring the lubrication, and determined by a real machine verification test, a simulation, and the like to be stored previously in the control device 52.

When an opening degree of the equalizing valve 117 is controlled such that the pressure of the high-pressure chamber 114 is completely equal to that of the low-pressure chamber 113e, the expansion unit 110 becomes over-expanded. That is, although a suction port of the operation chamber V has the same pressure as that of a discharge port thereof, the pressure of an intermediate room located between these ports is decreased with respect to the suction port. In this case, a fixed side and an operating side of the scroll are sucked, and a load is applied to a tooth tip side thereof, which may enhance the load to a tip seal of a seal material, causing damage to the seal material. For this reason, the communication passage 116 between the high-pressure chamber 114 and the low-pressure chamber 113e without the operation chamber V has a pressure loss with respect to the opening degree for complete pressure equalization. This can cause a slight difference in pressure in the oil collection operation, thereby preventing application of a load to the tooth tip of the scroll.

In this way, the Rankine cycle 40 and the fluid machine of this embodiment allow the working fluid to flow with the pressure of a sliding surface of the sliding portion, such as the sliding plate 113c and the bearing 113d, decreased by sliding surface pressure adjustment means including the equalizing valve 117 or the like as compared with that in the normal operation. Thereafter, decreasing of the sliding surface pressure by the sliding surface pressure adjustment means is released.

With this arrangement, the lubricant oil is supplied to the sliding portion by the control of the sliding surface pressure by the sliding surface pressure adjustment means without needing complicated control, which can provide the machine with a simple structure. This can prevent seizing in actuation of the Rankine cycle 40 to ensure a product life.

The Rankine cycle 40 and the fluid machine of the embodiment include the communication passage 116 for communicating the high-pressure chamber 114 with the low-pressure chamber 113e, and the equalizing valve 117 for opening and closing the communication passage 116. The working fluid flows inside the machine with the communication passage 116 opened by the equalizing valve 117, and thereafter the communication passage 116 is closed by the equalizing valve 117. With this arrangement, the feed of the lubricant oil to the sliding portion can be performed with the simple structure and not by the complicated control.

The separation means may be provided in the downstream area from the communication passage 116. In this case, since the oil is separated at the low-pressure area, the flow rate of the working fluid is easily controlled, thereby providing the Rankine cycle or fluid machine which facilitates the separation.

In the Rankine cycle of this embodiment, preferably, the driven portion by the expansion unit 110 may be constructed of the motor generator 120 serving as electric rotation means, and the expansion unit 110 and the motor generator 120 may be integrally formed. The adoption of this structure can shrink the size of a space constituting the fluid machine. The use of a rotation force of the motor generator can separate the oil.

The refrigerant pump 130 for circulating the working fluid may be integrally provided with the expansion unit 110 on the discharge side of the working fluid of the expansion unit 110 in the Rankine cycle. The lubricant oil separated by the separation means may be sucked by the difference in pressure between the expansion unit 110 and the refrigerant pump 130, and may lead to the sliding portion, such as the sliding plate 113c of the expansion unit 110. In this case, the space for constructing the fluid machine including the refrigerant pump 130 can be shrunk.

A control method of the Rankine cycle of this embodiment includes a first step of guiding lubricant oil to the sliding surface by allowing the working fluid to flow with the pressure of the sliding surface, such as the sliding plate 113c, decreased, and a second step of stopping decreasing the sliding surface pressure. This control can provide the control method of the Rankine cycle without needing any complicated control. This can prevent wear and seizing of the sliding portion of the expansion unit in actuation of the Rankine cycle to ensure the product life. The first step may be a step of circulating the working fluid with the high-pressure chamber 114 of the expansion unit 110 communicated with the low-pressure chamber 113e thereof. The second step may be a step of interrupting the communication between the high-pressure chamber 114 and the low-pressure chamber 113e.

Alternatively, or additionally, the control method of the Rankine cycle of this embodiment may include a first step of guiding lubricant oil to the sliding surface by allowing the working fluid to circulate and flow by the refrigerant pump 130 with the high-pressure chamber 114 of the expansion unit 110 communicated with the low-pressure chamber 113e thereof, and a second step of closing communication between the high-pressure chamber 114 and the low-pressure chamber 113e. This control method can provide the control method of the Rankine cycle without needing any complicated control.

Alternatively, or additionally, the control method of the fluid machine of this embodiment may include a first step of guiding lubricant oil to the sliding surface by allowing the working fluid to flow with the pressure of the sliding surface, such as the sliding plate 113c, decreased, and a second step of stopping decreasing the sliding surface pressure. This control can provide the control method of the fluid machine by performing these two steps without needing any complicated control. This can prevent wear and seizing of the sliding plate 113c or the like to ensure the product life. For example, the first step may be a step of circulating the working fluid with the high-pressure chamber 114 communicated with the low-pressure chamber 113e. The second step may be a step of interrupting the communication between the high-pressure chamber 114 and the low-pressure chamber 113e.

Alternatively, or additionally, the control method of the fluid machine of this embodiment includes a first step of guiding lubricant oil to the sliding surface by allowing the working fluid to flow and circulate with the high-pressure chamber 114 communicated with the low-pressure chamber 113e, and a second step of closing communication between the high-pressure chamber 114 and the low-pressure chamber 113e. This control method can provide the separation technique of lubricant oil without needing any complicated control.

Furthermore, in the control method of the Rankine cycle or fluid machine, the communication between the high-pressure chamber 114 and the low-pressure chamber 113e may be controlled to be closed so as to stop decreasing the sliding surface pressure when the lubricant oil detection condition for detecting the feed of the lubricant oil to the sliding portion (for example, the sliding plate 113c) is satisfied. In adoption of this control, the detection of the lubricant oil detection condition that is appropriately determined enables the equalizing valve 117 to perform the more appropriate control of communication of the communication passage 116, thereby reducing the performance of needless oil separation control.

The lubricant oil detection condition may preferably be that a predetermined time has passed since start of decreasing the sliding surface pressure, or since communication of the communication passage 116. In the case of adoption of this detection condition, the predetermined time determined by a real machine verification test, a simulation, and the like is used for the control, so that the separated lubricant oil can be surely fed to the sliding portion.

The lubricant oil detection condition may preferably be that the circulation amount of the working fluid reaches a predetermined amount. In the case of adoption of this detection condition, the predetermined circulation amount of the working fluid required for the lubricant oil to be fed to the sliding portion is determined by a real machine verification test, a simulation, and the like, and previously stored in the control means or the like. The predetermined circulation amount is used for the control, so that the necessary amount of lubricant oil can be surely fed to the sliding portion.

Second Embodiment

Figure 3:
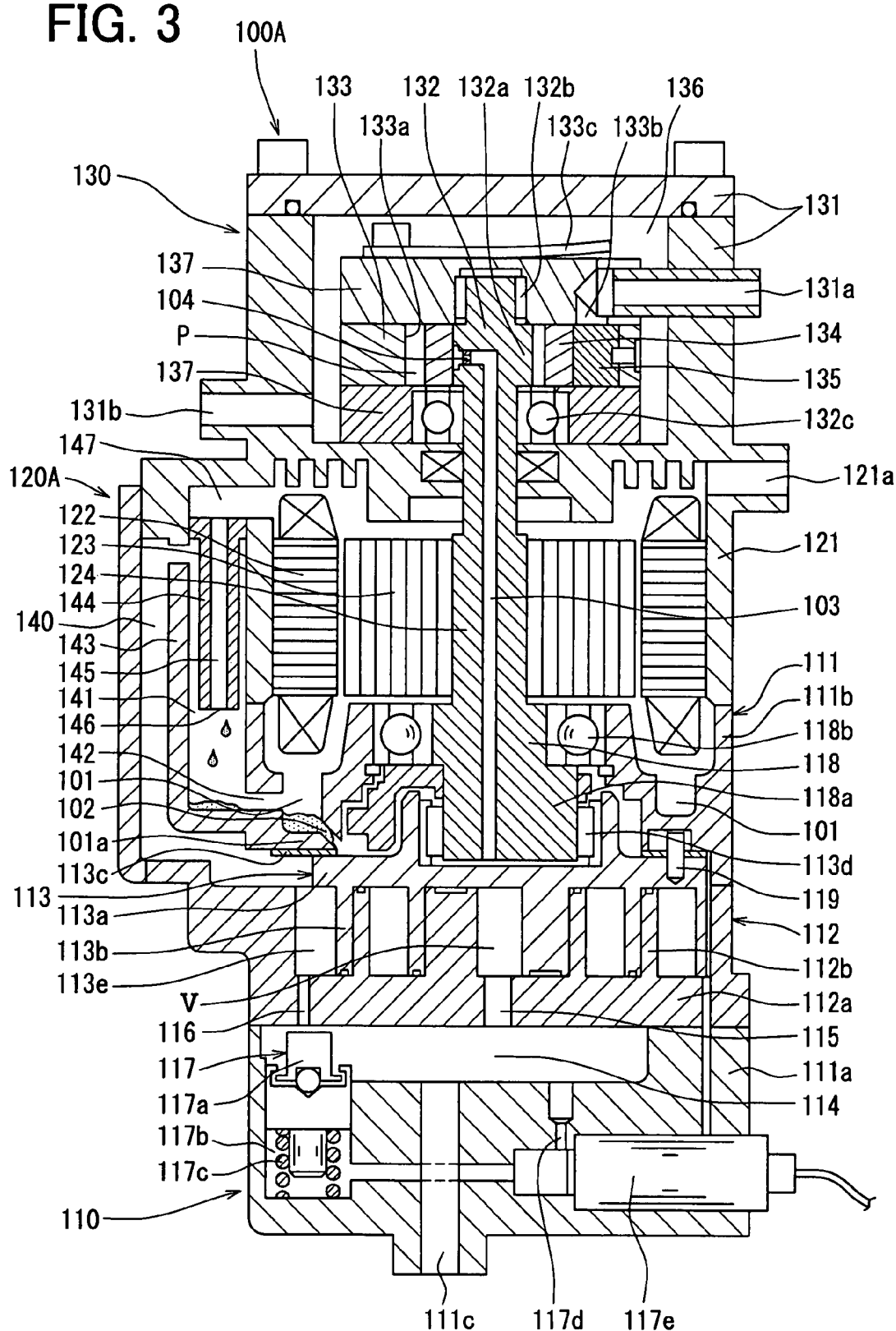
FIG. 3 is a sectional view showing a structure of a refrigerant-pump integrated type expansion generator of a second embodiment of the present invention.

A fluid machine of this embodiment will be described below using FIGS. 3 and 4. FIG. 3 is a sectional view showing the structure of a refrigerant-pump integrated type expansion generator of this embodiment (hereinafter referred to as a pump expansion generator 100A). FIG. 4 shows the flowchart of the operation control procedure of the pump expansion generator 100 as described in the first embodiment. However, the operation control of the pump expansion generator 100A of this embodiment is also based on this flowchart.

As shown in FIG. 3, the pump expansion generator 100A of this embodiment differs from the pump expansion generator 100 of the above-mentioned first embodiment in the structure of a motor generator 120A, which includes a centrifugal separator 144 for separating lubricant oil from refrigerant using a centrifugal force as separation means. The structure, operation, and control of each component are the same as those of the pump expansion generator 100 of the first embodiment.

On the opposite side of the motor housing 121 to the low-pressure port 121a is provided a first discharge gas passage 140 serving as a fluid passage which extends upward from the low pressure side of both scrolls 112, 113 of the expansion unit 110, that is, from the outer peripheral side of the scroll to lead to the upper part of the motor housing 121. A second discharge gas passage 141 is provided in the downstream area from the first discharge gas passage 140. The centrifugal separator 144 is disposed in this passage 141. The first discharge gas passage 140 and the second discharge gas passage 141 are formed as annular flow paths communicated with each other such that the first discharge gas passage 140 and the second discharge gas passage 141 are located outside and inside a partition wall 143.

The centrifugal separator 144 in the second discharge gas passage 141 has an annular portion having an annular section. The overheated steam refrigerant serving as the working fluid flows into an annular inner passage 145, and lubricant oil having a large density revolves by the centrifugal force to become droplets on the outer wall, which fall due to gravity to be stored in the oil reservoir 101 through an oil outflow passage 142. Gas having a low density flows out through the annular inner passage 145, and further flows from the low-pressure port 121a through the third discharge gas passage 147 provided in the downstream upper part. Then, the gas leads to the vapor-liquid separator 33 via the condenser 32.

The lubricant oil whose viscosity is increased by being heated in the oil reservoir 101 falls through the oil passage 102 due to its weight, and is sucked by the difference in pressure between the expansion unit 110 and the refrigerant pump 130 to lead to the sliding plate 113c and the bearing 113d, which are sliding portions of the expansion unit 110. The oil then leads to the bearings 132b, 132c from the rotor 134 of the refrigerant pump 130 via the shaft passage 103. Thereafter, the lubricant oil flows in the same manner as that of the first embodiment.

Thus, the separation means in the Rankine cycle or fluid machine of this embodiment may be preferably constructed of the centrifugal separator 144 for separating the lubricant oil from the working fluid using the centrifugal force. With this arrangement, the use of the centrifugal force allows gas having a small density to flow toward the downstream side, and splashes and drops the oil outward, which has a larger density than that of the gas. The simple structure using a rotation mechanism can enhance the accuracy of oil separation.

Third Embodiment

Figure 6:
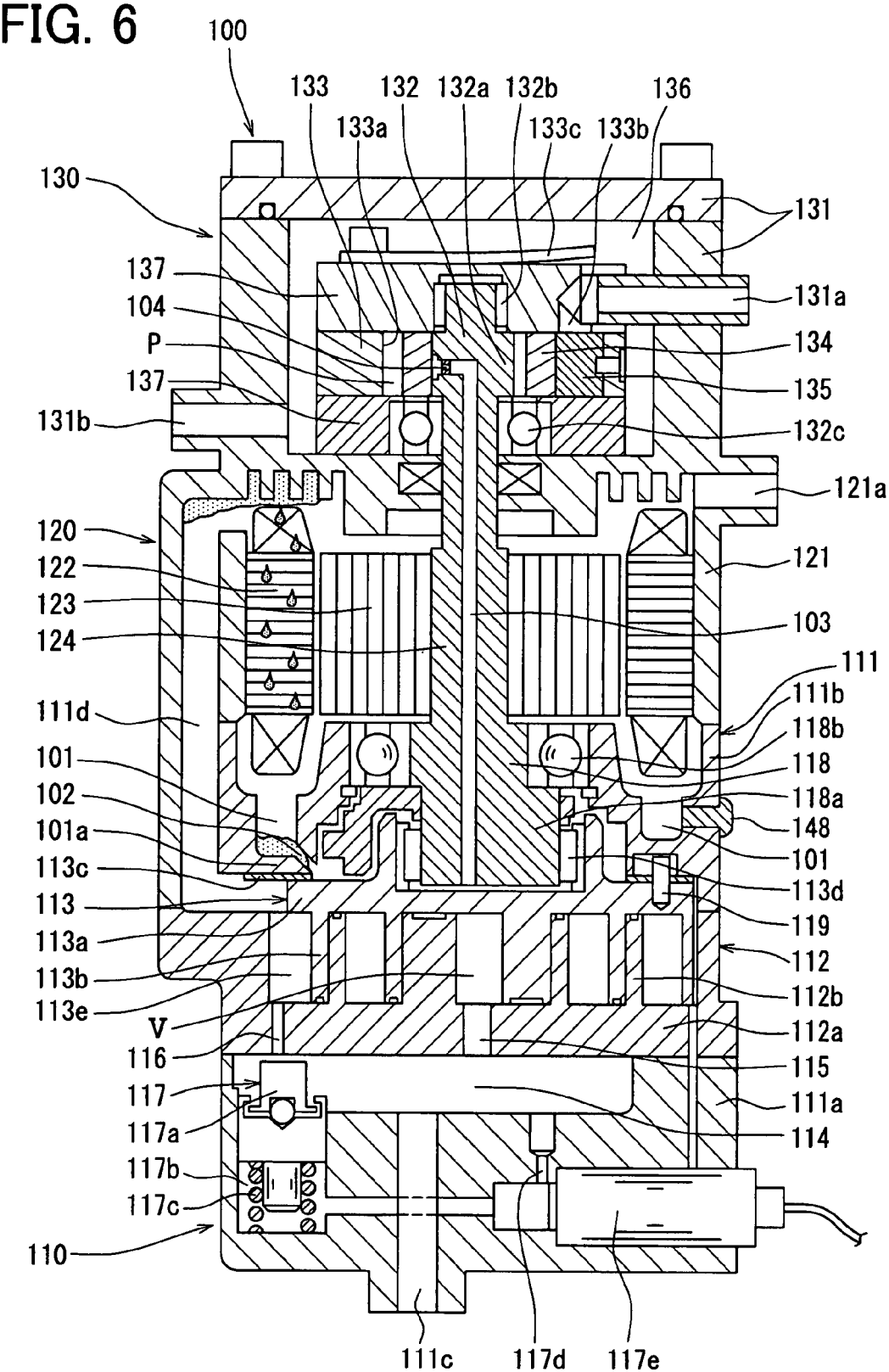
FIG. 6 is a sectional view showing a structure of a refrigerant-pump integrated type expansion generator of a third embodiment.
Figure 8:
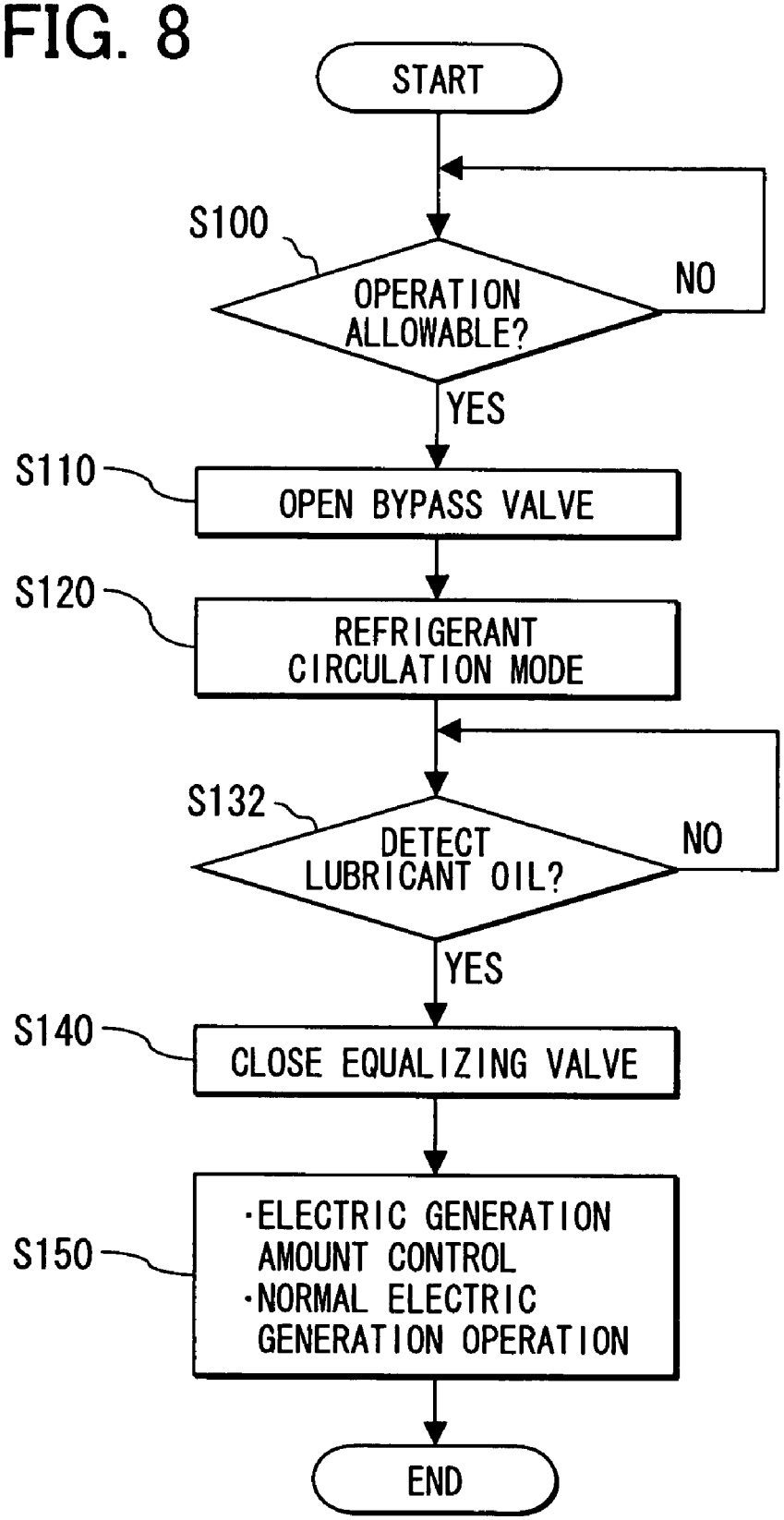
FIG. 8 is a flowchart showing another operation control method of the Rankine cycle or fluid machine which is performed by control means of the third and fourth embodiments.

A fluid machine of this embodiment will be described below using FIGS. 6 and 8. FIG. 6 is a sectional view showing the structure of a refrigerant pump integrated expansion generator of this embodiment (hereinafter referred to as a pump expansion generator 100). FIG. 8 shows a flowchart of an operation control method of the pump expansion generator 100 of this embodiment.

Figure 2:
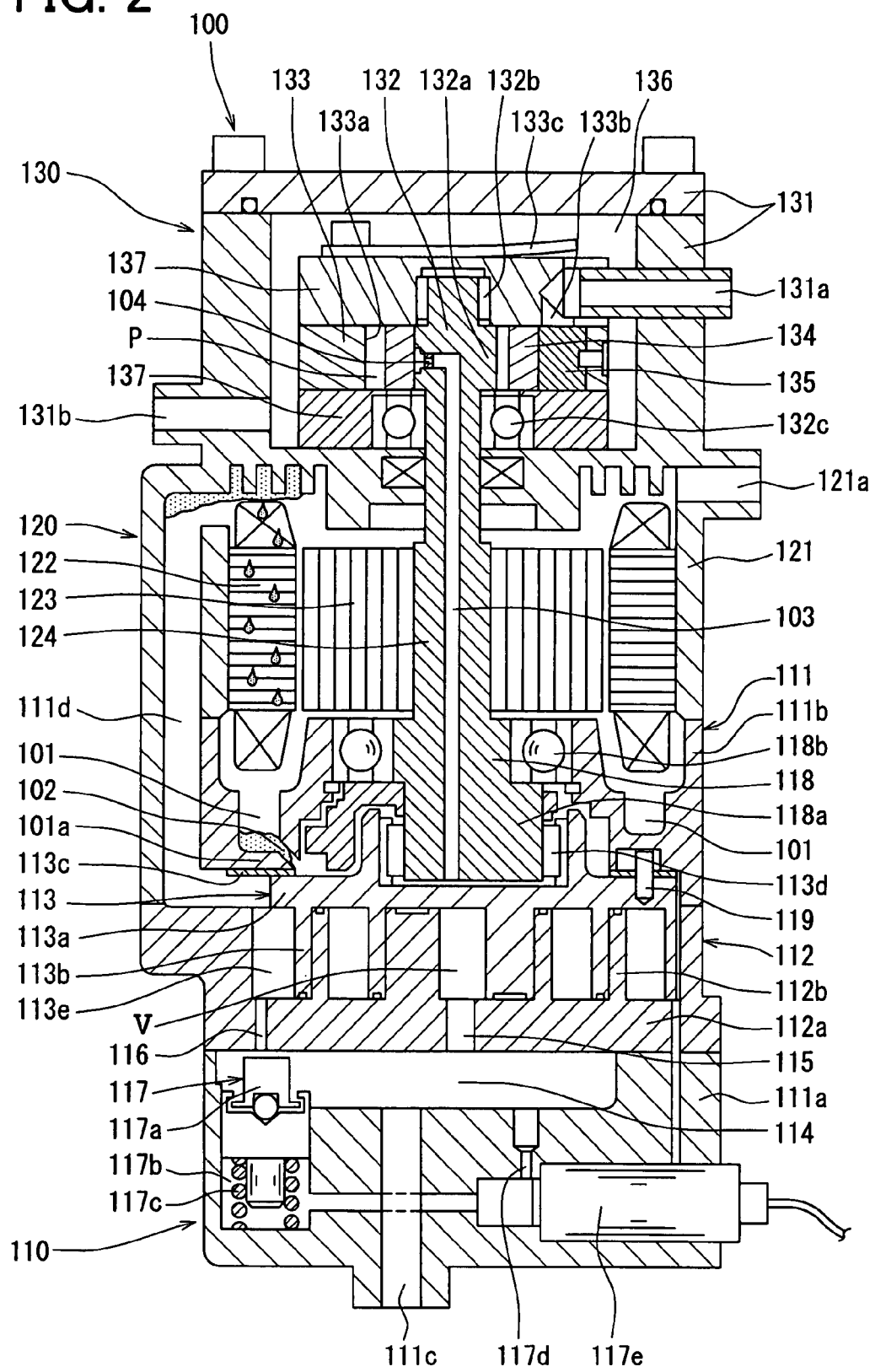
FIG. 2 is a sectional view showing a structure of a refrigerant-pump integrated type expansion generator of the first embodiment.

As shown in FIG. 6, the pump expansion generator 100 of this embodiment differs from the pump expansion generator 100 of the above-mentioned first embodiment shown in FIG. 2 in provision of an oil sensor 148 serving as oil detection means for detecting the presence of the lubricant oil in the oil reservoir 101. The structures and operations of other parts of this embodiment are the same as those of the pump expansion generator 100 of the first embodiment.

Figure 4:
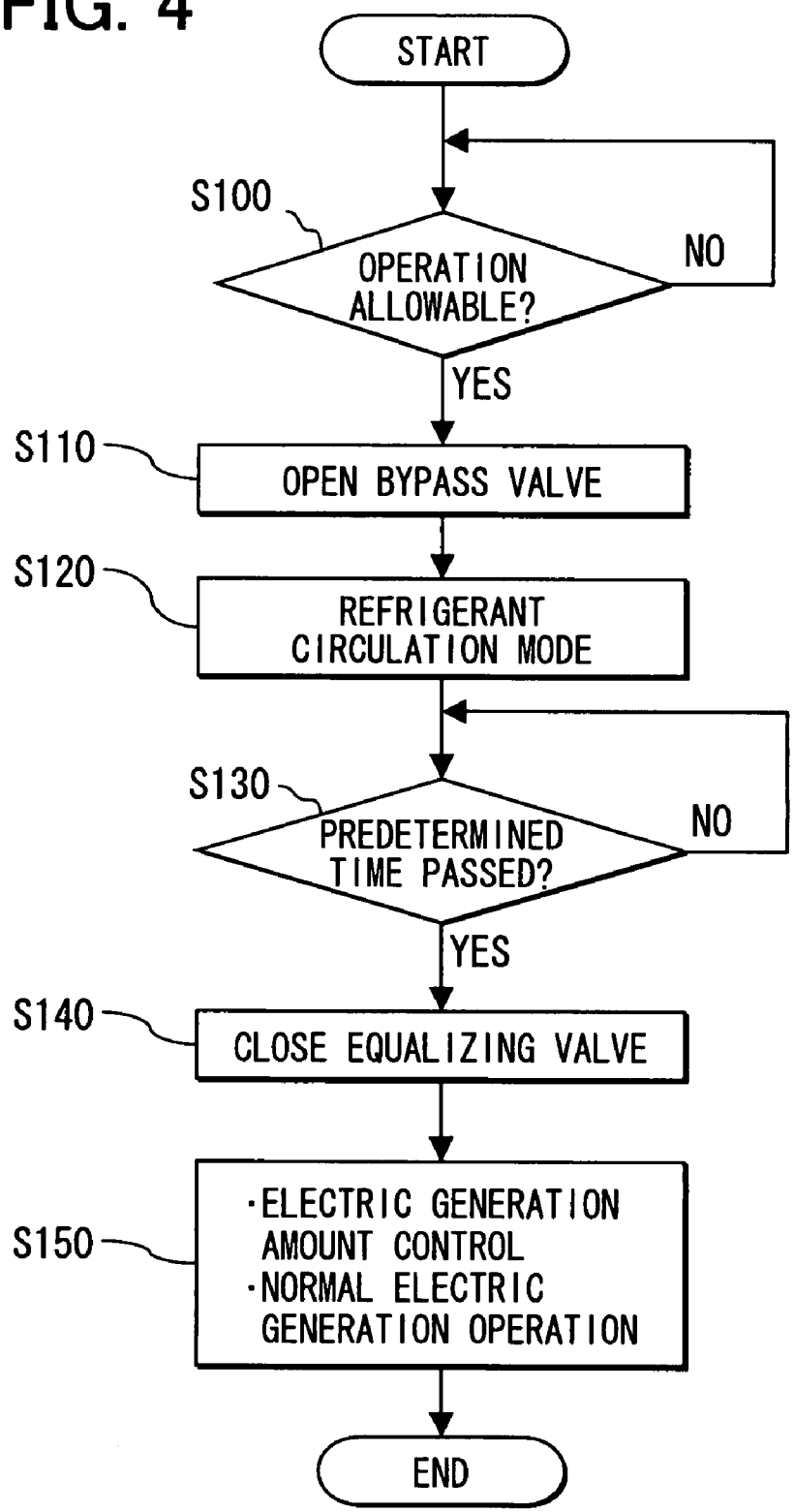
FIG. 4 is a flowchart showing an operation control method of the Rankine cycle or fluid machine which is performed by control means of the first and second embodiments.
Figure 5:
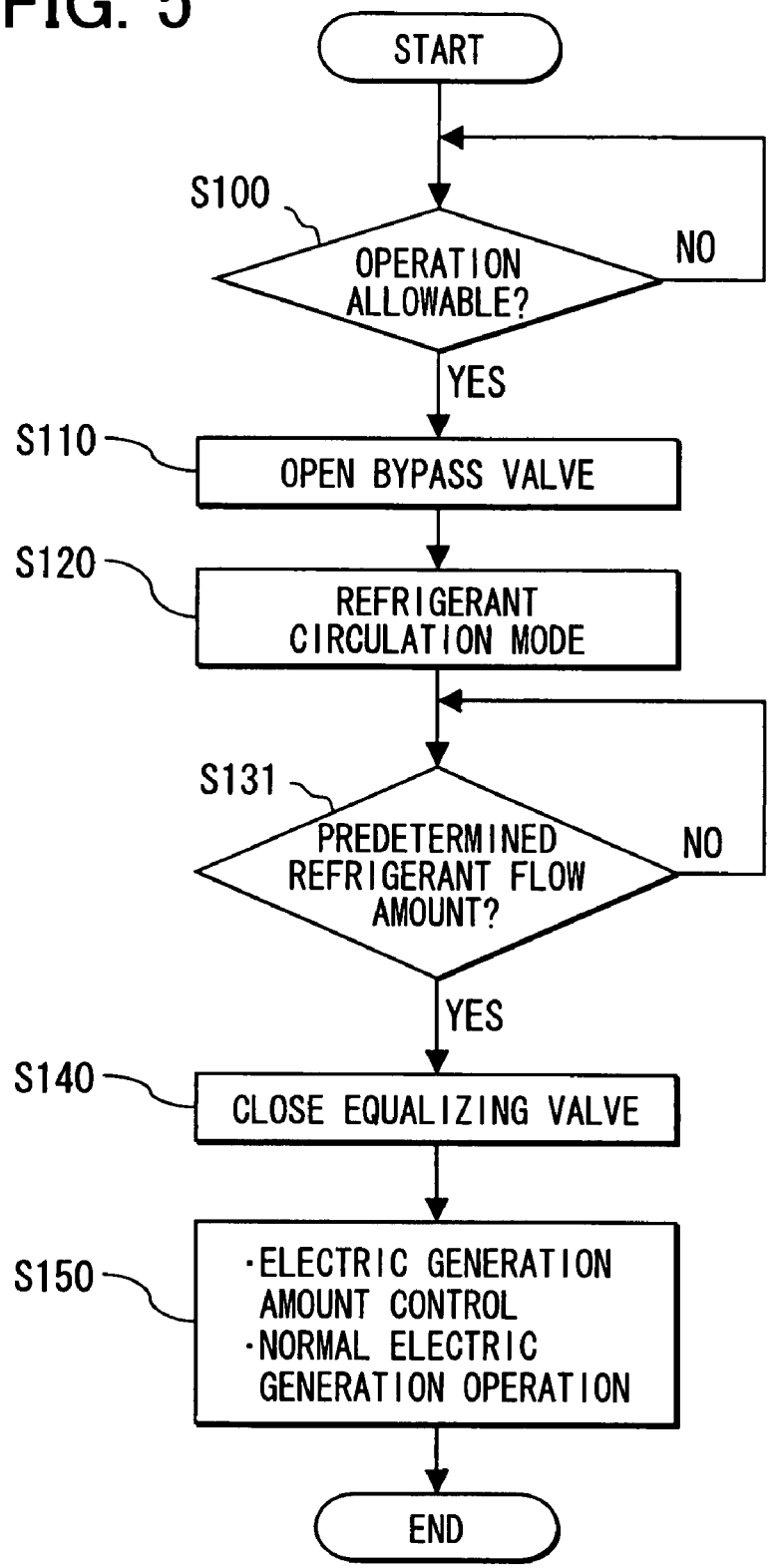
FIG. 5 is a flowchart showing another operation control method of a Rankine cycle or a fluid machine which is performed by control means of the first and second embodiments.

The operation control method of the pump expansion generator 100 of this embodiment includes step S132 shown in FIG. 8, which is a modification to step S130 in the control method shown in FIG. 4. In this case, after performing the process in the above-mentioned step S120, the control device 52 determines whether or not the lubricant oil is detected by the oil sensor 148 after the actuation of the refrigerant pump 130 in step S132. When the lubricant oil is determined to be detected, the control device 52 determines that the lubricant oil is fed to the sliding portion, and then closes the equalizing valve 117. Specifically, the electromagnetic valve 117e is energized to be closed, and thus the valve body 117a slides toward the substrate portion 112a side, thereby closing the communication passage 116 (which is performed in step S140).

The time when the lubricant oil is detected by the oil sensor 148 is the time when a lubricant oil detection condition is satisfied. The lubricant oil detection condition is for detecting the separation of lubricant oil from the refrigerant and the feed of the lubricant oil separated to the sliding portion, including the sliding plate 113c.

As mentioned above, the Rankine cycle or fluid machine of this embodiment may preferably include the oil detection means 148 for detecting the presence of lubricant oil in the oil reservoir 101 or on the sliding surface. Preferably, the above-mentioned lubricant oil detection condition is that the lubricant oil existing in the oil reservoir 101 or on the sliding surface is detected. In adoption of this structure or control method, the detection of the lubricant oil existing in the oil reservoir 101 or on the sliding surface can be used for the oil separation control. This can perform the more appropriate communication control of the communication passage 116 by the equalizing valve 117, thereby feeding the lubricant oil to the sliding portion more securely.

Fourth Embodiment

Figure 7:
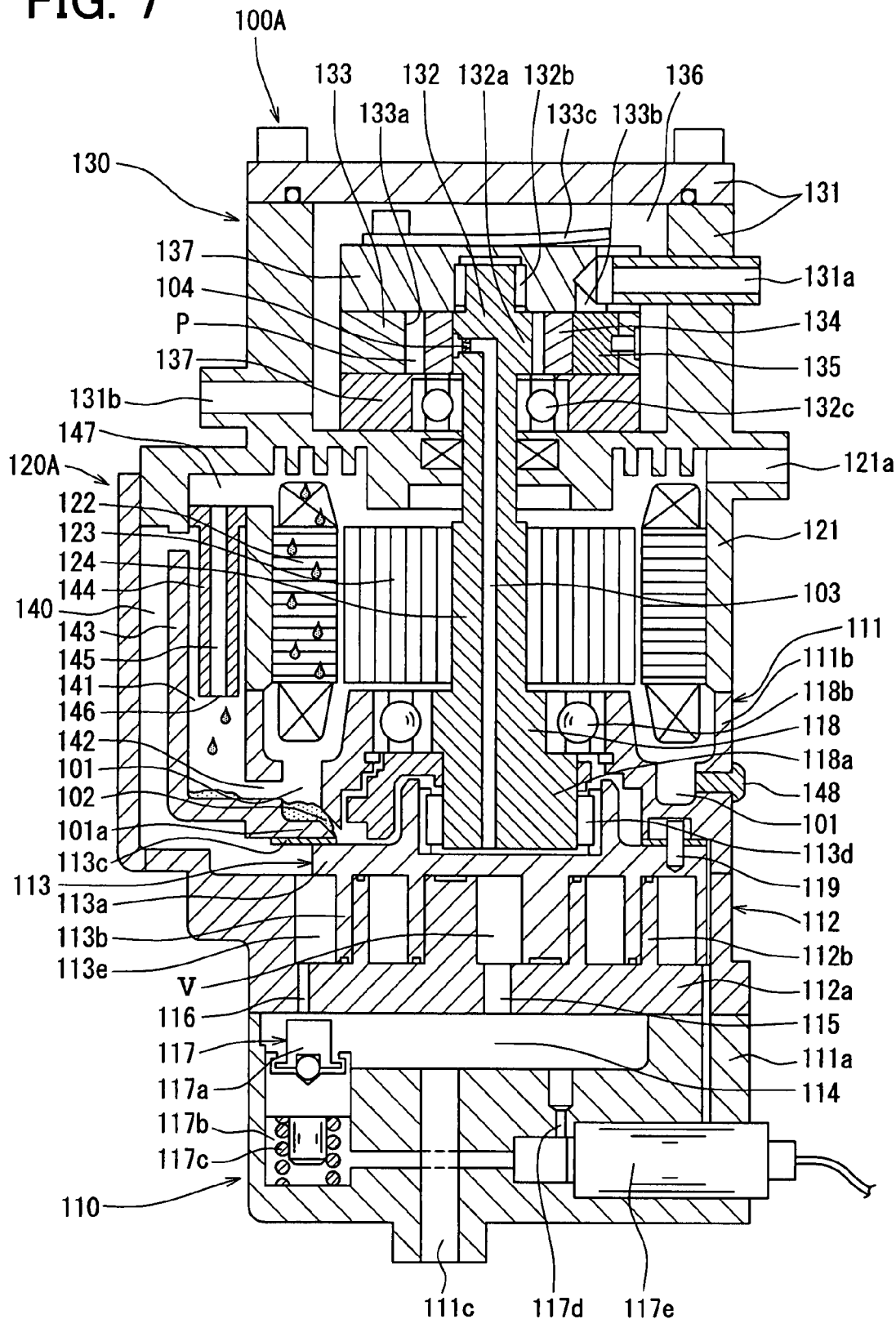
FIG. 7 is a sectional view showing a structure of a refrigerant-pump integrated type expansion generator of a fourth embodiment.

A fluid machine of this embodiment will be described below using FIGS. 7 and 8. FIG. 7 is a sectional view showing the structure of a refrigerant-pump integrated type expansion generator of this embodiment (hereinafter referred to as a pump expansion generator 100). FIG. 8 shows a flowchart of an operation control method of the pump expansion generator 100 of this embodiment. This flowchart is the same as that of the third embodiment.

As shown in FIG. 7, the pump expansion generator 100 of this embodiment differs from the pump expansion generator 100A of the above-mentioned second embodiment shown by use of FIG. 3, in provision of the oil sensor 148 serving as oil detection means for detecting the presence of the lubricant oil in the oil reservoir 101. The structures and operations of other parts of this embodiment are the same as those of the pump expansion generator 100A of the second embodiment. The operation control method of the pump expansion generator 100A of this embodiment has the same procedure as that of the above-mentioned third embodiment, and thus a description thereof will be omitted.

Fifth Embodiment

Figure 9:
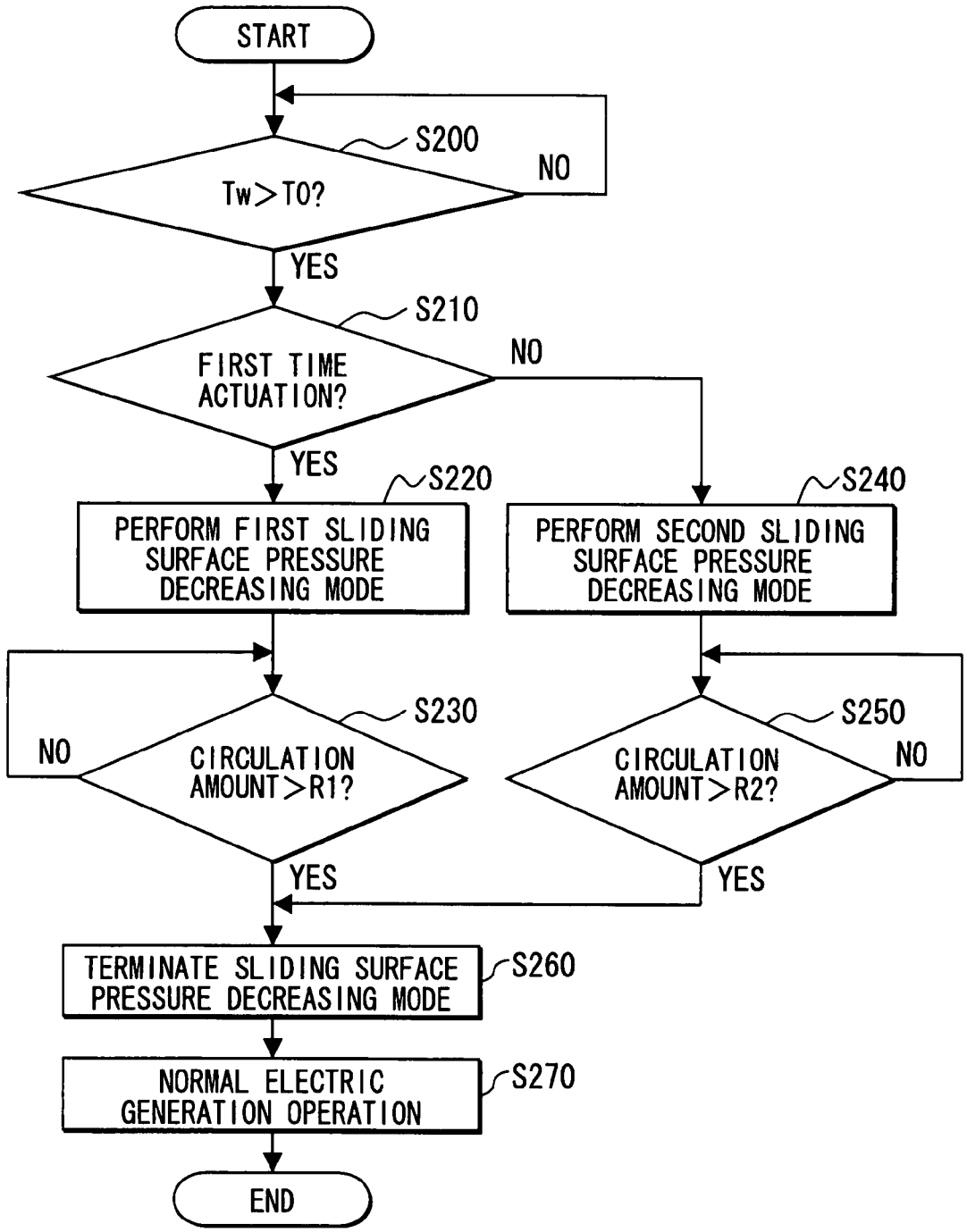
FIG. 9 is a flowchart showing another operation control method of the Rankine cycle or fluid machine of a fifth embodiment which is performed by each of the control means of the first, second, third, and fourth embodiments.

An operation control method of the Rankine cycle or fluid machine according to this embodiment will be described below using FIG. 9. FIG. 9 is a flowchart showing an operation control method of the Rankine cycle or pump expansion generators 100, 100A, which method is performed by the control means of this embodiment.

The control device 52 serving as the control means performs a sliding surface pressure decreasing mode which involves decreasing the sliding surface pressures of the sliding portions 113c and 113d, in the first step of guiding lubricant oil to the sliding surface by allowing the working fluid to flow with the pressure of the sliding surface, such as the sliding plate 113c, decreased.

The control device 52 includes a mode start determination unit for determining whether a condition for starting the sliding surface pressure decreasing mode is satisfied or not, and a mode termination determination unit for determining whether a condition for terminating the sliding surface pressure decreasing mode performed is satisfied or not.

First, the mode start determination unit of the control device 52 determines whether or not a water temperature Tw of the engine 10 is higher than a predetermined temperature T0 (step S200). The step S200 is a step of determining whether or not the sliding surface pressure decreasing mode should be started. In this step, the water temperature detected by an engine water temperature thermistor or the like is compared with the predetermined temperature T0 previously stored.

When the water temperature is a low temperature, which is equal to or lower than the predetermined temperature T0, since an oil separation portion does not obtain a sufficient degree of overheat, the refrigerant cannot be separated completely from the lubricant oil. As a result, the separated liquid is a fluid having a low viscosity. However, this cannot ensure the lubricant oil in a state appropriate for the lubrication of the sliding portion, or in an necessary amount. For this reason, as the predetermined temperature T0, is used an appropriate water temperature determined by an experiment, experience, or the like so as to separate the lubricant oil having a high viscosity from the refrigerant by the separation means, such as the centrifugal separator 144 or the like.

When the mode start determination unit determines that the water temperature Tw of the engine 10 is higher than the predetermined temperature T0 in step S200, the control device 52 determines that the start condition of the sliding surface pressure decreasing mode is satisfied, and then determines whether this actuation of the Rankine cycle is the first time or not after stopping of the vehicle and turning on of an ignition switch (step S210).

This process step is a step of determining how the sliding surface pressure decreasing mode is performed based on the number of times of actuation of the expansion unit 110 or the Rankine cycle after stopping of the engine 10 and turning on of the ignition switch. When the number of times of actuation of the Rankine cycle after the stopping of engine 10 is less than a predetermined number of times, the control device 52 performs the first sliding surface pressure decreasing mode (step S220). When the number of times of actuation is equal to or greater than the predetermined number of times, the second sliding surface pressure decreasing mode is performed in which a circulation amount of the working fluid flowing through the inside is less than that in the first sliding surface pressure decreasing mode.

In this embodiment, the predetermined number of times employed in the process in step S210 and stored in the control device 52 is two. That is, the first sliding surface pressure decreasing mode is performed only in the first time when the actuation of the expansion unit 110 or the Rankine cycle is performed after the stopping of the engine 10 (step S220). The second sliding surface pressure decreasing mode is performed after the second time of actuation (step S240).

As the predetermined number of times is used an appropriate value determined by an experiment, experience or the like. The optimal number of times is selected based on the structures of the fluid machine and the cycle and the kind and amount of refrigerant used. A process in step S215 in a sixth embodiment to be described later may be employed instead of the process in step S210.

When the first sliding surface pressure decreasing mode is started in step S220, the mode termination determination unit of the control device 52 continues to execute the first sliding surface pressure decreasing mode until the circulation amount of the refrigerant (for example, a value determined by multiplying the number of revolutions of the refrigerant pump 130, which is of a fixed displacement type, by the time period of execution of the mode) exceeds a predetermined value R1 (step S230). When the second sliding surface pressure decreasing mode is started in step S240, the mode termination determination unit continues to execute the second sliding surface pressure decreasing mode until the circulation amount of the refrigerant, for example, a value determined by multiplying the number of revolutions of the above-mentioned refrigerant pump 130 by the time period of execution of the mode exceeds a predetermined value R2 (step S250).

The circulation amount in each mode is detected, for example, by a difference in pressure between the front and back of the throttle disposed on the upstream side of the suction port 131a, and sent to the control device 52. The predetermined value R1 is larger than the predetermined value R2, and as both predetermined values, are used respective appropriate values determined by an experiment, experience, or the like.

Alternatively, in the processes in step S230 and step S250, a predetermined time T1 and a predetermined time T2 previously stored in the control device 52 may be employed instead of the predetermined value R1 and the predetermined value R2. In this case, the predetermined value T1 is a time during which the lubricant oil can be collected in the sliding portion, and the predetermined value R2 is a time during which the lubricant oil circulates inside the fluid machine. The predetermined value T1 is larger than the predetermined value T2, and as both predetermined times, are used respective appropriate values determined by an experiment, experience, or the like. For example, the time can be employed in which a value obtained by multiplying a discharge amount of the refrigerant pump 130 with a cycle rate and an oil separation ratio is larger than a necessary amount of oil determined by summing the volume of the oil reservoir, the volume of the oil passage, and the volume of a space of the sliding portion.

The mode termination determination unit may determine the termination condition of the sliding surface pressure decreasing mode using the oil sensor 148 or the like, based on the height of an oil surface of the lubricant oil or the amount of the oil stored in the oil reservoir 101.

When the mode termination determination unit determines that the termination condition of the sliding surface pressure decreasing mode is satisfied by the step S230 or S250, the sliding surface pressure decreasing mode is terminated (step S260). In the first sliding surface pressure decreasing mode or the second sliding surface pressure decreasing mode, the same control processes as those in steps S110 and S120 of FIG. 4 are performed as mentioned in the above embodiments, and the process in step S260 is the same control process as that in step S140 of FIG. 4.

Thus, in performing the process in step S230, the following control is performed when the vehicle is actuated after stopping of the engine, for example, after a several hours or after one-half day or more, and then the operation of the Rankine cycle is first actuated. The control involves allowing the refrigerant to make at least one revolution inside the cycle, separating lubricant oil from the refrigerant by the separation means, and filling the sliding portion with the lubricant oil. In contrast, in performing the process in step S250, when the operation of the Rankine cycle is restarted, for example, when sufficient time has not passed since the previous operation of the Rankine cycle, the lubricant oil is fed from the oil reservoir to the sliding portion, and then the sliding portion is filled with the lubricant oil.

Then, the control device 52 performs the normal electric generation operation together with the control of electric generation in step S270, and thereafter terminates a series of control processes. In this normal electric generation operation, the same control process as that of the above-mentioned embodiments in step S150 of FIG. 4 is performed.

As mentioned above, the fluid machine or Rankine cycle 40 of this embodiment performs the sliding surface pressure decreasing mode when a condition for starting this mode is satisfied in the first step of the control method. The starting condition corresponds to a time when the temperature of a coolant of the engine 10 exceeds the predetermined temperature in actuation of the expansion unit 110 serving as the fluid means.

In adoption of this control, when the refrigerant is in the appropriate state for ensuring the lubricant oil suitable for lubrication, the sliding surface pressure decreasing mode can be performed, thereby effectively carrying out the sliding surface pressure decreasing control while minimizing waste. When the coolant temperature of the engine 10 exceeds the predetermined temperature, the lubricant oil having a high viscosity appropriate for the lubrication can be separated, and circulated sufficiently, resulting in good heat exchange efficiency of the heat exchanger, thus enhancing the efficiency of electric generation.

Furthermore, the fluid machine or Rankine cycle 40 of this embodiment terminates the sliding surface pressure decreasing mode when the circulation amount of the working fluid flowing through the inside in operation of the expansion unit 110 exceeds the predetermined amount in the above-mentioned second step of the control method. In adoption of this control, after the sliding portion is sufficiently filled with the lubricant oil, the sliding surface pressure decreasing mode can be terminated.

Sixth Embodiment

Figure 10:
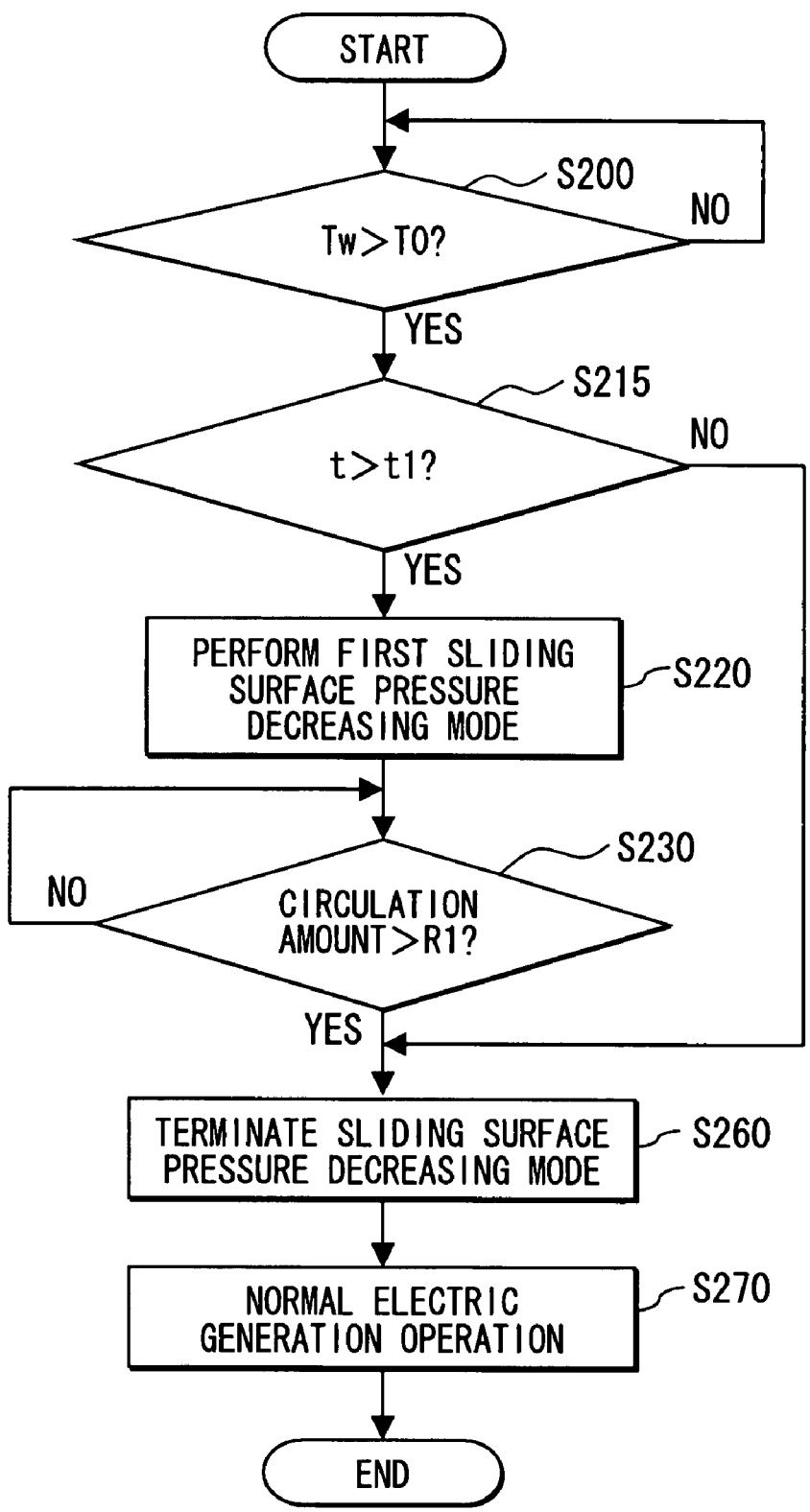
FIG. 10 is a flowchart showing another operation control method of the Rankine cycle or fluid machine of a sixth embodiment which is performed by each of the control means of the first, second, third, and fourth embodiments.

An operation control method of the Rankine cycle or fluid machine according to the sixth embodiment will be described below using FIG. 10. In this embodiment, the process in step S210 of the operation control method of the Rankine cycle or pump expansion unit 100, 100A as described in the fifth embodiment is replaced by a process in step S215. When a condition of step S215 is not satisfied, the second sliding surface pressure decreasing mode associated with steps S240 and S250 is not performed. FIG. 10 is a flowchart showing an operation control method of the Rankine cycle or the pump expansion unit 100, 100A, which method is performed by the control means of this embodiment.

As shown in FIG. 10, when the mode start determination unit determines that the water temperature Tw of the engine 10 is higher than the predetermined temperature T0 in step S200, the control device 52 determines that the start condition of the sliding surface pressure decreasing mode is satisfied, and then determines whether or not an elapsed time t from the previous stopping time to an actuation time of the expansion unit 110 exceeds a predetermined time t1 (step S215). Instead of the process in step S215, the process in step S210 of the fifth embodiment may be employed.

The process step S215 is a step of determining how the sliding surface pressure decreasing mode is performed based on how much time has expired since the previous stopping time till the time of actuation of the expansion unit 110. When it is determined that the elapsed time from the previous stopping time to the actuation time of the expansion unit 110 exceeds the predetermined time, the control device 52 performs the first sliding surface pressure decreasing mode (step S220). When the predetermined time elapsed is not reached, the control device 52 puts an end to the sliding surface pressure decreasing mode without performing this mode (step S260).

As mentioned above, the fluid machine or Rankine cycle 40 of this embodiment is controlled not to perform the sliding surface pressure decreasing mode corresponding to the above-mentioned first step of the control method in actuation of the expansion unit 110 when the elapsed time after the previous stopping time does not exceed the predetermined time.

Alternatively or additionally, the fluid machine or Rankine cycle 40 of this embodiment may be controlled not to perform the sliding surface pressure decreasing mode corresponding to the above-mentioned first step of the control method when the number of times of actuation of the expansion unit 110 reaches the predetermined number of times after stopping of the engine 10 and then after turning on of the ignition switch.

In adoption of either control, when the lubricant oil is spread over the sliding portion and still remains there, the sliding surface pressure decreasing mode can be controlled not to be performed, which enables the effective sliding surface pressure decreasing control while minimizing waste.

Other Embodiments

Although in the above description, the preferred embodiments of the present invention have been described, the present invention is not limited thereto. Various modifications and variations can be made to the disclosed embodiments without departing from the scope of the present invention.

For example, although the expansion unit 110 is explained as an example of the fluid machine in the above embodiments, the fluid machine according to the present invention is not limited to the expansion unit, and may be a compressor for generating a driving force by compressing working fluid which is heated to be brought into a vapor phase state.

The separation means consisting of the centrifugal separator 144 and the like is disposed in the downstream area from the communication passage 116, but may be provided in the upstream area from the communication passage 116. In adoption of this structure, since the oil is separated in the high pressure area, the volume flow rate of the working fluid (refrigerant) is small, thereby enabling a reduction in pressure loss. When the Rankine cycle or fluid machine is designed on the same pressure loss condition, a space for oil separation can be rendered small.

Although in the above-mentioned embodiments, the expansion unit 110 and the refrigerant pump 130 are formed integrally, they may be formed independently.

The equalizing valve 117 is formed as the valve body 117a for opening and closing the communication passage 116 in cooperation with the opening and closing of the electromagnetic valve 117e. However, the equalizing valve 117 is not limited thereto, and may be any other electromagnetic valve for directly opening and closing the communication passage 116.

The motor generator 120 is operated by the driving force collected by the expansion unit 110 to store electric energy in the battery 11. However, kinetic energy by a flywheel, or mechanical energy, such as elastic energy or the like by a spring, may be stored.

Although the refrigerant pump 130 is connected to the expansion unit 110 as described in the above description, a link between both components may be cut and a refrigerant pump driven by a dedicated electric motor may be used.

The expansion unit 110 is of a scroll type, and the refrigerant pump 130 is of a rolling piston type, but the present invention is not limited thereto, and can employ a gear pump type, a trochoid type, or any other type.

Although the Rankine cycle 40 is provided with the refrigeration cycle 30, only the Rankine cycle 40 without the refrigeration cycle or the like may be implemented.

A component for giving waste heat to the heater 42 is not limited to the engine 10. Any other component for generating heat in operation, while dissipating part of the heat for temperature control, can be widely applied. These components include, for example, an external combustion engine, a fuel battery stack for a fuel battery vehicle, various kinds of motors, and inverters. In this case, a heating source for the heater 42 is a fluid for cooling of various kinds of waste heat systems.

What is claimed is:

1. A fluid machine comprising:
   means for compressing or expanding a working fluid which is heated to be brought into a vapor phase state after circulating in a cycle;
   means for storing lubricant oil for lubricating a sliding surface of the fluidization means;
   a lubricant oil feed passage for guiding the lubricant oil stored in the storing means to a sliding portion of the compressing or expanding means by a flow of the working fluid;
   means for adjusting a sliding surface pressure of the sliding portion, and
   means for controlling the adjusting means to perform a sliding surface pressure decreasing mode which involves decreasing the sliding surface pressure of the sliding portion,
   wherein the working fluid flows inside the fluid machine with the sliding surface pressure of the sliding portion decreased as compared with that in a normal operation of the compressing or expanding means by the adjusting means, and thereafter the decreasing of the sliding surface pressure by the adjusting means is released; and
   wherein the controlling means starts the sliding surface pressure decreasing mode when a temperature of a coolant for an engine exceeds a predetermined temperature in actuation of the compressing or expanding means.

2. The fluid machine according to claim 1, wherein the adjusting means comprises means for opening and closing a communication passage for communicating a high-pressure portion of the compressing or expanding means with a low-pressure portion thereof.

3. The fluid machine according to claim 1, further comprising means for separating the lubricant oil from the working fluid, the lubricant oil being adapted to be fed to the storing means,
   wherein the separation separating means is constructed of a centrifugal separator for separating the lubricant oil from the working fluid using a centrifugal force.

4. The fluid machine according to claim 1, further comprising means for detecting presence of the lubricant oil in the oil storage means.

5. The fluid machine according to claim 1,
   wherein the controlling means terminates the sliding surface pressure decreasing mode when a circulation amount of the working fluid flowing inside the fluid machine in operation of the compressing and expanding means exceeds a predetermined amount.

6. The fluid machine according to claim 1,
   wherein the controlling mean does not perform the sliding surface pressure decreasing mode when the number of times of actuation of the compressing and expanding means after stopping of the engine and turning on of an ignition switch reaches a predetermined number or more.

7. The fluid machine according to claim 1,
   wherein the controlling means does not perform the sliding surface pressure decreasing mode in actuation of the compressing or expanding means when an elapsed time from a previous stopping time does not exceed a predetermined time.

8. A fluid machine comprising:
   means for compressing or expanding a working fluid which is heated to be brought into a vapor phase state after circulating in a cycle;
   means for storing lubricant oil for lubricating a sliding surface of the fluidization means;
   a lubricant oil feed passage for guiding the lubricant oil stored in the storing means to a sliding portion of the compressing or expanding means by a flow of the working fluid;
   means for adjusting a sliding surface pressure of the sliding portion; and
   means for controlling the operation of the pressure adjusting means to perform a first sliding surface pressure decreasing mode and a second sliding surface pressure decreasing mode which involve decreasing the sliding surface pressure of the sliding portion,
   wherein the working fluid flows inside the fluid machine with the sliding surface pressure of the sliding portion decreased as compared with that in a normal operation of the compressing or expanding means by the adjusting means, and thereafter the decreasing of the sliding surface pressure by the adjusting means is released
   wherein the controlling means performs the first sliding surface pressure decreasing mode when the number of times of actuation of the compressing or expanding means after stopping of the engine and turning on of the ignition switch is less than a predetermined number, and performs the second sliding surface pressure decreasing mode when the number of times of actuation of the compressing or expanding means reaches the predetermined number or more, the second sliding surface pressure decreasing mode involving decreasing a circulation amount of the working fluid flowing inside the fluid machine as compared with that in the first sliding surface pressure decreasing mode.

9. The fluid machine according to claim 8,
   wherein the controlling means performs the first sliding surface pressure decreasing mode in actuation of the compressing or expanding means when an elapsed time from the previous stopping time exceeds a predetermined time, and performs the second sliding surface pressure decreasing mode in actuation of the compressing or expanding means when the elapsed time does not exceed the predetermined time, wherein the second sliding surface pressure decreasing mode involves decreasing the circulation amount of the working fluid flowing inside the fluid machine as compared with that in the first sliding surface pressure decreasing mode.

10. A Rankine cycle comprising:
    a pump for pressurizing and feeding a working fluid;
    a heater for heating the working fluid pressurized and fed by the pump into a vapor-phase state;
    an expansion unit for generating a driving force by expanding the working fluid flowing from the heater;
    a condenser for condensing the working fluid flowing from the expansion unit;
    means for storing lubricant oil for lubricating a sliding surface of the expansion unit ;
    a lubricant oil feed passage for guiding the lubricant oil stored in the storing means to a sliding portion of the expansion unit by a flow of the working fluid;
    means for adjusting a sliding surface pressure of the sliding portion; and
    means for controlling operations of the pump and the adjusting,
    wherein the controlling means operates the pump with the sliding surface pressure of the sliding portion decreased as compared with that in a normal operation of the expansion unit by the adjusting means, and then stops the decreasing of the sliding surface pressure by the adjusting means; and wherein the controlling means starts a sliding surface pressure decreasing mode which involves decreasing the sliding surface pressure of the sliding portion when a temperature of a coolant for an engine exceeds a predetermined temperature in actuation of the expansion unit.

11. The Rankine cycle according to claim 10, wherein the adjusting means includes means for opening and closing a communication passage through which a high- pressure portion of the expansion unit communicates with a low-pressure portion of the expansion unit.

12. The Rankine cycle according to claim 10, further comprising means for separating the lubricant oil from the working fluid, the lubricant oil being adapted to be fed to the storing means,
wherein the separation separating means is constructed of a centrifugal separator for separating the lubricant oil from the working fluid using a centrifugal force.

13. The Rankine cycle according to claim 10, further comprising means for detecting presence of the lubricant oil in the oil storage means.

14. The Rankine cycle according to claim 10, further comprising electric rotation means that is operated by the driving force generated by the expansion unit,
wherein the electric rotation means and the expansion unit are integrally formed.

15. The Rankine cycle according to claim 10, wherein the pump is integrally formed with the expansion unit on a working fluid discharge side of the expansion unit.

16. The Rankine cycle according to claim 10, wherein the controlling means terminates a sliding surface pressure decreasing mode which involves decreasing the sliding surface pressure of the sliding portion when a circulation amount of the working fluid flowing inside the cycle in operation of the expansion unit exceeds a predetermined amount.

17. The Rankine cycle according to claim 10, wherein the controlling means does not perform the sliding surface pressure decreasing mode which involves decreasing the sliding surface pressure of the sliding portion when the number of times of actuation of the expansion unit after stopping of the engine and turning on of an ignition switch reaches a predetermined number or more.

18. The Rankine cycle according to claim 10, wherein the controlling means does not perform the sliding surface pressure decreasing mode which involves decreasing the sliding surface pressure of the sliding portion in actuation of the expansion unit when an elapsed time from a previous stopping time does not exceed a predetermined time.

19. A Rankine cycle comprising:
a pump for pressurizing and feeding a working fluid;
a heater for heating the working fluid pressurized and fed by the pump into a vapor-phase state;
an expansion unit for generating a driving force by expanding the working fluid flowing from the heater;
a condenser for condensing the working fluid flowing from the expansion unit;
means for storing lubricant oil for lubricating a sliding surface of the expansion unit;
a lubricant oil feed passage for guiding the lubricant oil stored in the storing means to a sliding portion of the expansion unit by a flow of the working fluid;
means for adjusting a sliding surface pressure of the sliding portion; and
means for controlling operations of the pump and the adjusting means,
wherein the controlling means operates the pump with the sliding surface pressure of the sliding portion decreased as compared with that in a normal operation of the expansion unit by the adjusting means, and then stops the decreasing of the sliding surface pressure by the adjusting means;
wherein the controlling means is configured to perform a first sliding surface pressure decreasing mode and a second sliding surface pressure decreasing mode which involve decreasing the sliding surface pressure of the sliding portion, and
wherein the controlling means performs the first sliding surface pressure decreasing mode when the number of times of actuation of the expansion unit after stopping of the engine and turning on of the ignition switch is less than a predetermined number, and performs the second sliding surface pressure decreasing mode when the number of times of actuation reaches the predetermined number or more, wherein the second sliding surface pressure decreasing mode involves decreasing a circulation amount of the working fluid flowing inside the Rankine cycle as compared with that in the first sliding surface pressure decreasing mode.

20. The Rankine cycle according to claim 19,
wherein the controlling means performs the first sliding surface pressure decreasing mode in actuation of the expansion unit when an elapsed time from the previous stopping time exceeds a predetermined time, and performs the second sliding surface pressure decreasing mode in actuation of the expansion unit when the elapsed time does not exceed the predetermined time, the second sliding surface pressure decreasing mode involving decreasing the circulation amount of the working fluid flowing inside the cycle as compared with that in the first sliding surface pressure decreasing mode.

21. A control method of a fluid machine, the fluid machine comprising means for compressing or expanding a working fluid which is heated to be brought into a vapor phase state after circulating in a cycle, and a sliding portion of the compressing or expanding means, the fluid machine being adapted to feed lubricant oil to the sliding portion, the control method comprising:
a first step of guiding lubricant oil to a sliding surface of the fluidization compressing or expanding means by allowing the working fluid to flow with a sliding surface pressure of the sliding portion decreased; and
a second step of stopping the decreasing of the sliding surface pressure.

22. The control method of a fluid machine according to claim 21,
wherein the first step is a step of allowing the working fluid to flow by communicating a high-pressure portion of the compressing or expanding means with a low-pressure portion thereof, and
wherein the second step is a step of interrupting the communication between the high-pressure portion of the compressing or expanding means and the low-pressure portion.

23. The control method of the fluid machine according to claim 21, wherein the second step involves stopping the decreasing of the sliding surface pressure, or closing the communication passage when a lubricant oil detection condition for detecting feed of the lubricant oil to a sliding surface of the sliding portion is satisfied.

24. The control method of the fluid machine according to claim 23, wherein the lubricant oil detection condition is that a predetermined time has passed after start of decreasing the sliding surface pressure, or since communication of the communication passage.

25. The control method of the fluid machine according to claim 23, wherein the lubricant oil detection condition is that an amount of circulation of the working fluid in the cycle reaches a predetermined amount.

26. The control method of the fluid machine according to claim 23, wherein the lubricant oil detection condition is that the lubricant oil existing on the sliding surface of the sliding portion is detected.

* * * * *